(12) United States Patent
Hiramatsu et al.

(10) Patent No.: US 10,689,007 B2
(45) Date of Patent: Jun. 23, 2020

(54) AUTONOMOUS VEHICLE OPERATING APPARATUS AND AUTONOMOUS VEHICLE OPERATING METHOD

(71) Applicant: Nissan Motor Co., Ltd., Yokohama-shi, Kanagawa (JP)

(72) Inventors: Machiko Hiramatsu, Kanagawa (JP); Takashi Sunda, Kanagawa (JP); Youji Shimizu, Kanagawa (JP); Akihiko Ebina, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 88 days.

(21) Appl. No.: 15/772,436

(22) PCT Filed: Nov. 4, 2015

(86) PCT No.: PCT/JP2015/081035
§ 371 (c)(1),
(2) Date: Apr. 30, 2018

(87) PCT Pub. No.: WO2017/077598
PCT Pub. Date: May 11, 2017

(65) Prior Publication Data
US 2018/0326995 A1 Nov. 15, 2018

(51) Int. Cl.
*B60W 50/08* (2020.01)
*G05D 1/02* (2020.01)
(Continued)

(52) U.S. Cl.
CPC ......... *B60W 50/082* (2013.01); *B60W 30/08* (2013.01); *B60W 30/146* (2013.01);
(Continued)

(58) Field of Classification Search
CPC ...... B60W 50/08; B60W 30/09; B60W 40/10; B60W 30/06; B60W 30/14; B60W 10/04;
(Continued)

(56) References Cited

U.S. PATENT DOCUMENTS

| 7,753,150 B2 * | 7/2010 | Tamor | B60W 10/06 |
| | | | 180/65.265 |
| 8,718,861 B1 * | 5/2014 | Montemerlo | B60W 30/00 |
| | | | 701/26 |

(Continued)

FOREIGN PATENT DOCUMENTS

| FR | 2878327 A1 * | 5/2006 | ............ G01L 1/24 |
| JP | H03068126 U | 7/1991 | |

(Continued)

*Primary Examiner* — Yuri Kan
(74) *Attorney, Agent, or Firm* — Young Basile Hanlon & MacFarlane, P.C.

(57) ABSTRACT

An autonomous vehicle operating apparatus is installed in an autonomous vehicle having two autonomous traveling modes of a first autonomous traveling mode for traveling without operation by a driver and a second autonomous traveling mode for traveling in accordance with an operation by the driver. The autonomous vehicle operating apparatus defines an operating section according to traveling conditions and circumferential conditions, and controls the autonomous vehicle in the second autonomous traveling mode to travel in accordance with the operation by the driver during a period in which the autonomous vehicle is located in the operating section.

32 Claims, 17 Drawing Sheets

(51) Int. Cl.

| | | |
|---|---|---|
| *G05D 1/00* | (2006.01) | |
| *B60W 50/10* | (2012.01) | |
| *B60W 50/14* | (2020.01) | |
| *G08G 1/16* | (2006.01) | |
| *B60W 30/08* | (2012.01) | |
| *B60W 30/14* | (2006.01) | |
| *B60W 30/18* | (2012.01) | |
| *B60W 40/04* | (2006.01) | |

(52) U.S. Cl.
CPC ...... *B60W 30/18154* (2013.01); *B60W 40/04* (2013.01); *B60W 50/10* (2013.01); *B60W 50/14* (2013.01); *G05D 1/0061* (2013.01); *G05D 1/0088* (2013.01); *G08G 1/16* (2013.01); *B60W 2050/146* (2013.01); *B60W 2540/215* (2020.02); *B60W 2555/60* (2020.02); *B60W 2556/50* (2020.02); *B60W 2720/10* (2013.01); *B60Y 2302/05* (2013.01)

(58) Field of Classification Search
CPC ... G06K 7/10; G05D 1/00; G05D 1/02; G01L 1/24; B60L 15/10; G06F 19/00; H04N 7/18
See application file for complete search history.

(56) References Cited

U.S. PATENT DOCUMENTS

| | | | |
|---|---|---|---|
| 2002/0005779 A1 | 1/2002 | Ishii et al. | |
| 2003/0055538 A1* | 3/2003 | Yanaka | B60L 15/10 |
| | | | 701/1 |
| 2008/0143833 A1* | 6/2008 | Yanai | B60R 1/00 |
| | | | 348/148 |
| 2010/0256883 A1* | 10/2010 | Sauter | F16H 61/0213 |
| | | | 701/65 |
| 2014/0324268 A1* | 10/2014 | Montemerlo | B60T 8/17 |
| | | | 701/25 |
| 2014/0343819 A1* | 11/2014 | Johansson | B60W 50/0097 |
| | | | 701/96 |
| 2015/0197254 A1* | 7/2015 | Wysietzki | B60W 40/10 |
| | | | 701/41 |
| 2016/0132705 A1* | 5/2016 | Kovarik | G06K 7/10376 |
| | | | 340/10.3 |
| 2016/0229397 A1* | 8/2016 | Muthukumar | B60R 21/013 |
| 2016/0347327 A1 | 12/2016 | Kondo et al. | |
| 2016/0368489 A1* | 12/2016 | Aich | B60W 30/06 |
| 2017/0106865 A1* | 4/2017 | Lavoie | B62D 15/027 |

FOREIGN PATENT DOCUMENTS

| | | |
|---|---|---|
| JP | 2000118261 A | 4/2000 |
| JP | 200133256 A | 2/2001 |
| JP | 2001347909 A | 12/2001 |
| JP | 2007126003 A | 5/2007 |
| JP | 2007127517 A | 5/2007 |
| JP | 2008189139 A | 8/2008 |
| JP | 2014044707 A | 3/2014 |
| JP | 2015141476 A | 8/2015 |
| JP | 2015153153 A | 8/2015 |
| JP | 2015157604 A | 9/2015 |

* cited by examiner

AUTONOMOUS VEHICLE OPERATING APPARATUS AND AUTONOMOUS VEHICLE OPERATING METHOD

TECHNICAL FIELD

The present invention relates to an autonomous vehicle operating apparatus and an autonomous vehicle operating method for operating an autonomous vehicle.

BACKGROUND

Autonomous vehicles have been proposed to autonomously travel on predetermined routes while detecting its circumferential conditions. Further, A technology is disclosed in which an operator outside a vehicle holds a remote controller to perform simple operations on the remote controller so that the vehicle can move while keeping its position relative to the remote controller (Japanese Patent Application Publication No. 2001-033256).

The technology disclosed in Japanese Patent Application Publication No. 2001-033256 does not operate an autonomous vehicle during traveling but takes restricted action such as parking through simple operations. It is occasionally desirable that autonomous vehicles be driven in accordance with operations by a driver depending on circumstances.

SUMMARY

In view of the above problems, the present invention provides an autonomous vehicle operating apparatus and an autonomous vehicle operating method capable of enhancing safety of an autonomous vehicle.

An autonomous vehicle operating apparatus is installed in an autonomous vehicle having two autonomous traveling modes of a first autonomous traveling mode for traveling without operation by a driver and a second autonomous traveling mode for traveling in accordance with an operation by the driver, and configured to define an operating section according to a traveling condition and a circumferential condition and control the autonomous vehicle to travel in the second autonomous traveling mode in accordance with the operation on an operating unit by the driver during a period in which the autonomous vehicle is located in the operating section.

The present invention can provide an autonomous vehicle operating apparatus and an autonomous vehicle operating method for autonomously switching between traveling modes depending on the operation by a driver so as to enhance safety of an autonomous vehicle.

DETAILED DESCRIPTION

Figure 1:
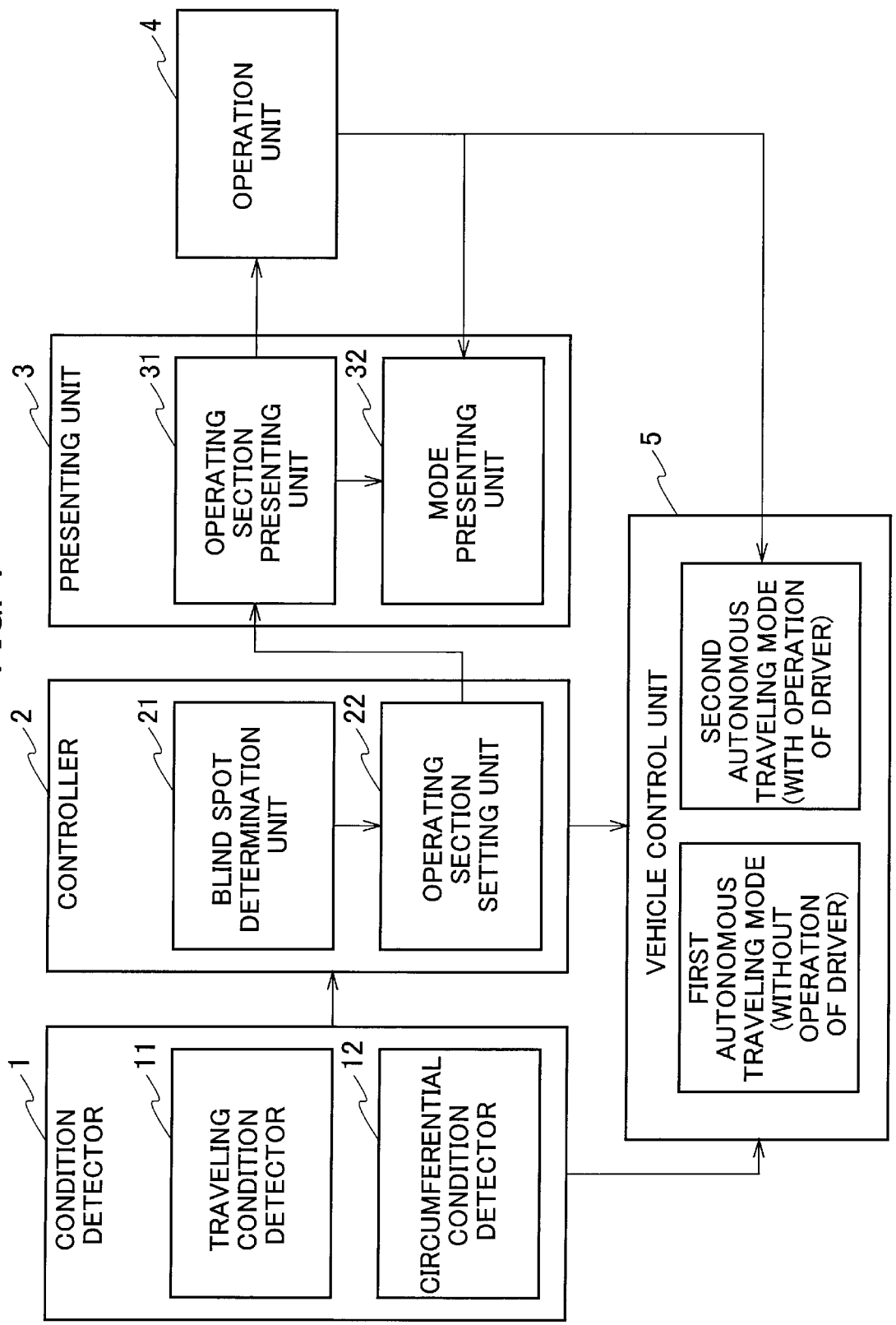
FIG. 1 is a block diagram describing a configuration of an autonomous vehicle operating apparatus according to a first embodiment of the present invention.

First to fourth embodiments of the present invention will be described below with reference to the drawings. The same or similar elements in the descriptions of the drawings are designated by the same or similar reference numerals, and overlapping explanations are not repeated below.

First Embodiment

An autonomous vehicle operating apparatus according to a first embodiment of the present invention includes a condition detector 1, a controller 2, a presenting unit 3, an operating unit 4, and a vehicle control unit 5, as shown in FIG. 1. The autonomous vehicle operating apparatus according to the first embodiment is installed in an autonomous vehicle A (refer to FIG. 4) having a first autonomous traveling mode for traveling without operation by a driver and a second autonomous traveling mode for traveling in accordance with the operation by the driver.

The condition detector 1 includes a traveling condition detector 11 which detects traveling conditions of the autonomous vehicle A, and a circumferential condition detector 12 which detects circumferential conditions of the autonomous vehicle A.

The traveling condition detector 11 includes sensors connected to a controller area network (CAN) bus to detect traveling states of the autonomous vehicle A, such as a speed sensor, an acceleration sensor, an angular velocity sensor, and a steering angle sensor, and a unit for detecting a current position of the autonomous vehicle A such as a global positioning system (GPS) receiver installed in a vehicle navigation system.

The traveling condition detector 11 detects a speed of the autonomous vehicle A, momentum such as acceleration and angular velocity of three axes in a three-dimensional orthogonal coordinate system, and a traveling position of the autonomous vehicle A in map information as the traveling states, for example. The traveling position is calculated according to a current position and momentum of the autonomous vehicle A. The traveling condition detector 11 calculates a position of the autonomous vehicle A relative to objects on the ground recorded in the map information according to objects on the ground detected by the circumferential condition detector 12, so as to obtain a specific traveling position of the autonomous vehicle A in the map information.

The circumferential condition detector 12 includes a sensor for detecting circumferential conditions of the autonomous vehicle A, such as a camera, a laser rangefinder (LRF), an ultrasonic sensor, a millimeter-wave sensor, and an infrared sensor. The circumferential condition detector 12 detects the circumferential conditions including the number, position, and speed of traffic participants such as other vehicles or pedestrians around the autonomous vehicle A.

The circumferential condition detector 12 also detects positions of various kinds of objects on the ground such as boundary lines of lanes, traffic signals, and road signs, in addition to traffic participants. The circumferential condition detector 12 can detect states of signal lights of traffic signals through image processing. The circumferential condition detector 12 may detect the circumferential conditions of the autonomous vehicle A by means of external communication. The circumferential conditions detected by the circumferential condition detector 12 further include traffic information such as traffic congestion and traffic restrictions, and weather information.

The controller 2 includes a blind spot determination unit 21 which determines the presence or absence of blind spots caused by obstacles around the autonomous vehicle A, and an operating section setting unit 22 which defines an operating section R (refer to FIG. 4) in which the autonomous vehicle A travels in the second autonomous traveling mode.

The blind spot determination unit 21 determines the presence or absence of blind spots caused by obstacles in a traveling direction of the autonomous vehicle A according to the traveling conditions detected by the traveling condition detector 11 and the circumferential conditions detected by the circumferential condition detector 12. When there is a blind spot in the traveling direction of the autonomous vehicle A, the blind spot determination unit 21 detects a distance from the autonomous vehicle A to the blind spot and a size (an angle) of the blind spot. Examples of obstacles causing blind spots include other vehicles, constructions along roads, curves or slopes on roads, rain, and snow.

The operating section setting unit 22 defines the operating section R according to the traveling conditions detected by the traveling condition detector 11 and the circumferential conditions detected by the circumferential condition detector 12. When the blind spot determination unit 21 determines that there is a blind spot, the operating section setting unit 22 defines the operating section R based on the blind spot. The operating section R is an area in which the autonomous vehicle A should drive at reduced speed or stop so as to check the safety with respect to other traffic participants that may appear from a blind spot detected.

The presenting unit 3 includes an operating section presenting unit 31 which presents information on the timing of switching between the first autonomous traveling mode and the second autonomous traveling mode to the driver in the autonomous vehicle A, and a mode presenting unit 32 which presents a current autonomous traveling mode to the driver in the autonomous vehicle A. The presenting unit 3 includes at least either a display which displays images or characters such as a liquid crystal display and a head-up display (HUD) or a speaker which reproduces voices.

The operating section presenting unit 31 provides the driver with information on the timing at which the autonomous vehicle A reaches a start point or an end point of the operating section R so as to present the timing of switching between the autonomous traveling modes to the driver. The timing presented to the driver may be the timing of preliminarily informing the driver as to when to switch between the autonomous traveling modes. In particular, the operating section presenting unit 31 may present an advance notice as to when to switch between the autonomous traveling modes to the driver at a point at which a distance from the autonomous vehicle A to each of the start point and the end point of the operating section R reaches a predetermined threshold. The start point of the operating section R is a point at which the autonomous vehicle A enters the operating section R, and the end point is a point at which the autonomous vehicle A leaves the operating section R.

The mode presenting unit 32 informs the driver that the current autonomous traveling mode is the first autonomous traveling mode when the autonomous vehicle A is not traveling in the operating section R. The mode presenting unit 32 informs the driver that the current autonomous traveling mode is the second autonomous traveling mode when the autonomous vehicle A is traveling in the operating section R.

Figure 2:
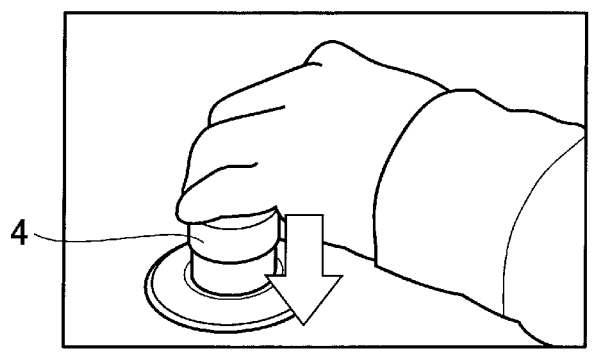
FIG. 2 is a view illustrating an operating unit in the autonomous vehicle operating apparatus according to the first embodiment of the present invention.

The operating unit 4 detects an action of operation performed on the operating unit 4 by the driver in the autonomous vehicle A and outputs an output signal corresponding to the operation to the vehicle controlling unit 5. The operating unit 4 detects at least the presence or absence of the operation by the driver. The operating unit 4 may be an input device which detects the presence or absence of the operation depending on displacement of the operating unit 4 caused by a force applied by the driver. The operating unit 4 may be a push-button input device, as shown in FIG. 2.

Alternatively, the operating unit 4 may be a pedal, a lever-type input device, an input device provided on the steering wheel, or the like. The use of a part of a unit conventionally included in a vehicle as the operating unit 4 simplifies the entire configuration and allows the driver to operate the operating unit 4 in a manner similar to the conventional unit, so as to improve the operability.

The vehicle control unit 5 controls driving and steering systems according to the traveling conditions and the circumferential conditions, so as to control the autonomous vehicle A to autonomously travel on a traveling route predetermined by the controller 2, for example. The vehicle control unit 5 controls the autonomous vehicle A in the second autonomous traveling mode to travel in accordance with the operation on the operating unit 4 by the driver when the autonomous vehicle A is located in the operating section R.

The vehicle control unit 5 controls the autonomous vehicle A in the first autonomous traveling mode to travel without operation by the driver according to the traveling conditions and the circumferential conditions. The vehicle control unit 5 controls the autonomous vehicle A in the second autonomous traveling mode to travel at reduced speed when the operating unit 4 detects the operation by the driver or stop when no operation is detected according to the traveling conditions and the circumferential conditions.

The vehicle control unit 5 of the autonomous vehicle operating apparatus according to the first embodiment controls the autonomous vehicle A in the second autonomous traveling mode only to travel at reduced speed or stop in accordance with the operation by the driver. The steering system and speed are controlled by the vehicle control unit 5 according to the traveling conditions and the circumferential conditions or depending on a blind spot detected. The vehicle control unit 5 thus controls the autonomous vehicle A to travel semi-autonomously in the second autonomous traveling mode with the simplified operation.

Autonomous Vehicle Operating Method

Figure 3:
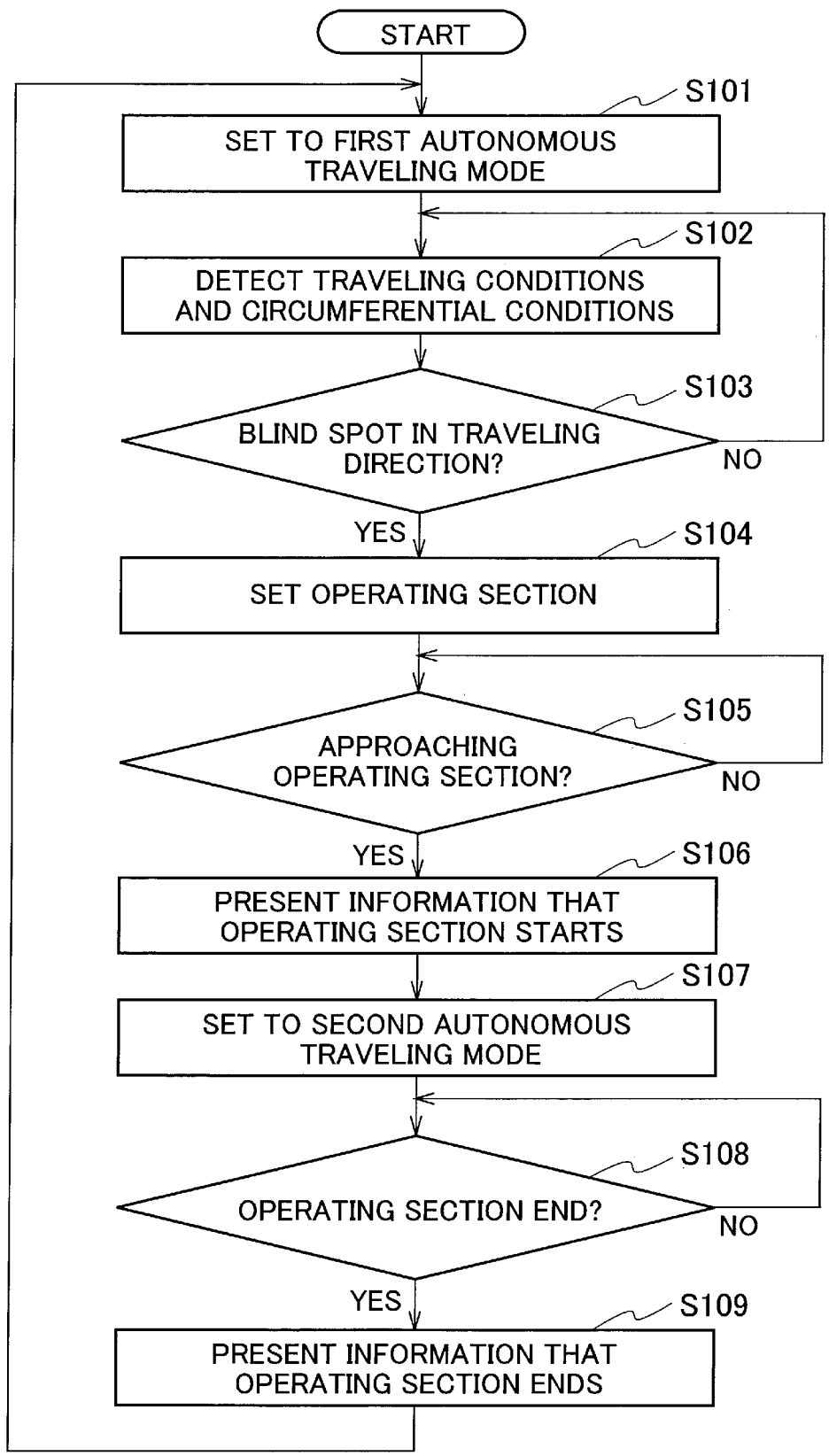
FIG. 3 is a flow chart for describing an autonomous vehicle operating method using the autonomous vehicle operating apparatus according to the first embodiment of the present invention.

An autonomous vehicle operating method using the autonomous vehicle operating apparatus according to the first embodiment is illustrated with reference to the flow chart shown in FIG. 3.

In step S101, the vehicle control unit 5 sets the initial autonomous traveling mode to the first autonomous traveling mode. The vehicle control unit 5 controls the autonomous vehicle A in the first autonomous traveling mode to travel without operation by the driver according to traveling conditions and circumferential conditions to be detected.

In step S102, the traveling condition detector 11 detects the traveling conditions of the autonomous vehicle A, and the circumferential condition detector 12 detects the circumferential conditions of the autonomous vehicle A.

In step S103, the blind spot determination unit 21 determines the presence or absence of a blind spot caused by an obstacle on a road within a predetermined distance in the traveling direction of the autonomous vehicle A according to the traveling conditions and the circumferential conditions detected in step S102. The blind spot determination unit 21 detects a distance from the autonomous vehicle A to a blind spot and a size of a blind spot. The process proceeds to step S104 when a blind spot is detected, or returns to step S102 when no blind spot is detected.

In step S104, the operating section setting unit 22 defines the operating section R in the traveling direction of the autonomous vehicle A according to the traveling conditions and the circumferential conditions and the blind spot detected in step S103.

In step S105, the controller 2 determines whether the autonomous vehicle A is approaching the operating section R. The controller 2 determines that the autonomous vehicle A is approaching the operating section R when a distance from the autonomous vehicle A to a start point of the operating section R is a predetermined threshold or less according to the traveling conditions and the circumferential conditions. The process proceeds to step S106 when the autonomous vehicle A is approaching the operating section R, or repeats the step S105 when the autonomous vehicle A is not approaching the operating section R yet.

In step S106, the operating section presenting unit 31 presents the information notifying or preliminarily notifying the driver that the operating section R, namely, the second autonomous traveling mode starts.

In step S107, the vehicle control unit 5 switches from the first autonomous traveling mode to the second autonomous traveling mode when the autonomous vehicle A enters the operating section R. The vehicle control unit 5 controls the autonomous vehicle A in the second autonomous traveling mode to travel in accordance with the operation on the operating unit 4 by the driver according to the traveling conditions and the circumferential conditions.

In step S108, the controller 2 determines whether the autonomous vehicle A reaches the end point of the operating section R. The process proceeds to step S109 when the autonomous vehicle A is determined to reach the end point, or repeats step S108 when the autonomous vehicle A does not reach the end point yet.

In step S109, the operating section presenting unit 31 presents the information notifying the driver that the operating section R ends, and the process returns to step S101.

Example of Operation

Figure 4:
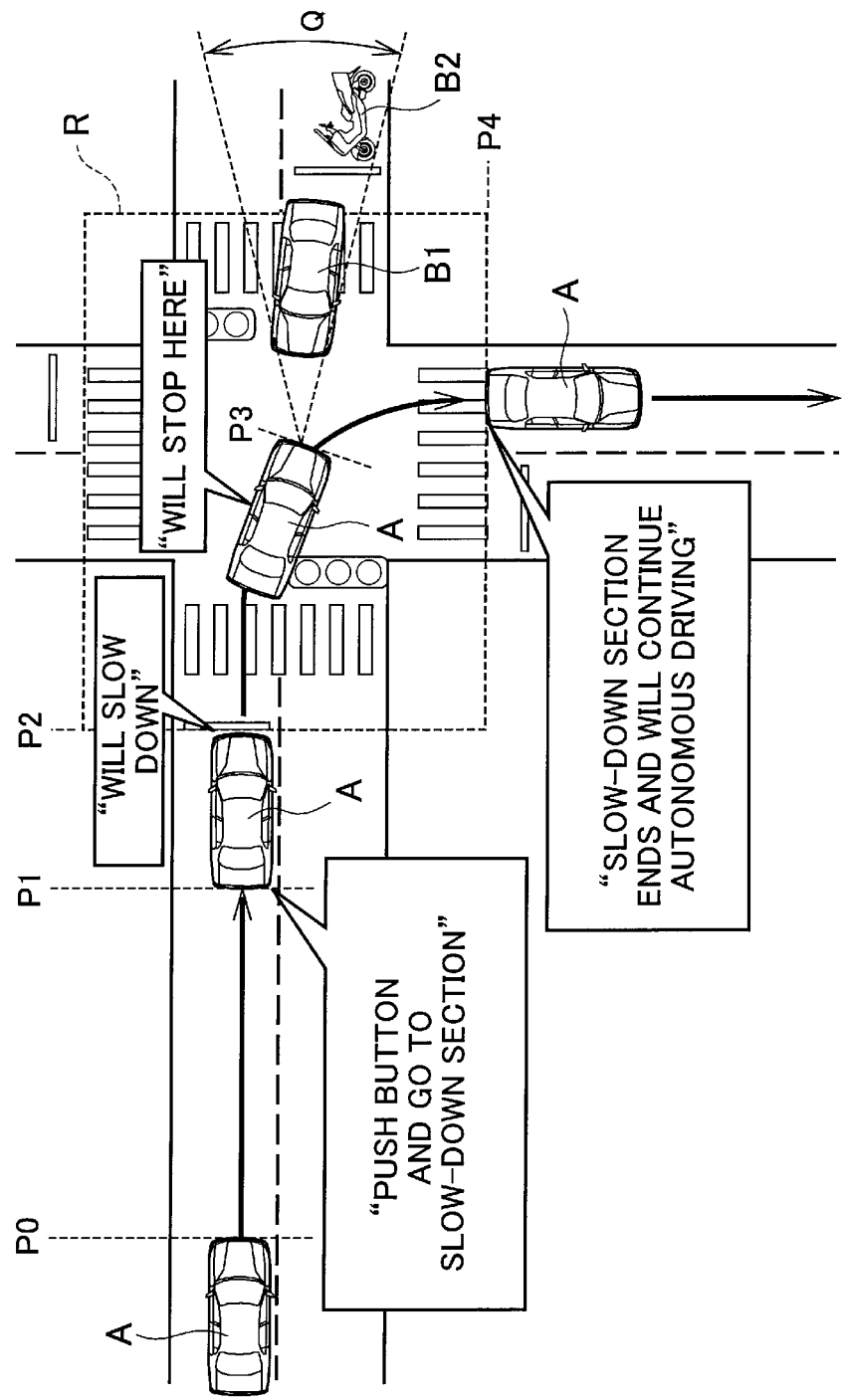
FIG. 4 is a view for describing an example of operation of the autonomous vehicle operating apparatus according to the first embodiment of the present invention.

FIG. 4 illustrates an example of operation of the autonomous vehicle operating apparatus according to the first embodiment in a case in which the autonomous vehicle A turns to the right at an intersection.

When the autonomous vehicle A is passing through the point P0, the vehicle control unit 5 controls the autonomous vehicle A in the first autonomous traveling mode to travel without operation by the driver according to the traveling conditions and the circumferential conditions.

When the autonomous vehicle A reaches the point P1, the blind spot determination unit 21 detects a vehicle B1 as a traffic participant waiting to turn right in the intersection in the traveling direction of the autonomous vehicle A, and detects a blind spot Q caused by the vehicle B1. The operating section setting unit 22 defines the operating section R since the blind spot Q is detected. The operating section R is an area including the intersection and the respective pedestrian crossings and defined such that a stop line in the lane in which the autonomous vehicle A is traveling is set to a start point of the operating section R, for example.

The operating section presenting unit 31 reproduces a voice, "Push the button to enter the slow-down section", for example, so as to present the information preliminarily notifying the driver that the current autonomous traveling mode will be switched to the second autonomous traveling mode. The driver starts operating the operating unit 4 in accordance with the presented information.

When the autonomous vehicle A is reaching the point P2 (the start point of the operating section R), the operating section presenting unit 31 reproduces a voice, "will slow down", for example, so as to present the information notifying the driver that the current autonomous traveling mode is switched to the second autonomous traveling mode.

When the autonomous vehicle A stars turning right and is reaching the point P3, the driver stops operating the operating unit 4 in order to check that there is no risk of colliding with another vehicle B2 that may appear from the blind spot caused by the vehicle B1. The autonomous vehicle A then stops at the point P3. The presenting unit 3 may inform the driver that the operation is interrupted by reproducing a voice, "will stop here", for example. The driver after checking the safety at the point P3 restarts operating the operating unit 4. The autonomous vehicle A thus restarts turning right.

When the autonomous vehicle A reaches the point P4 (the end point of the operating section R), the operating section presenting unit 31 reproduces a voice, "The slow-down section ends and will continue autonomous driving", for example, so as to present the information notifying the driver that the current autonomous traveling mode is switched to the first autonomous traveling mode. The driver stops operating the operating unit 4 in accordance with the presented information.

Figure 5:
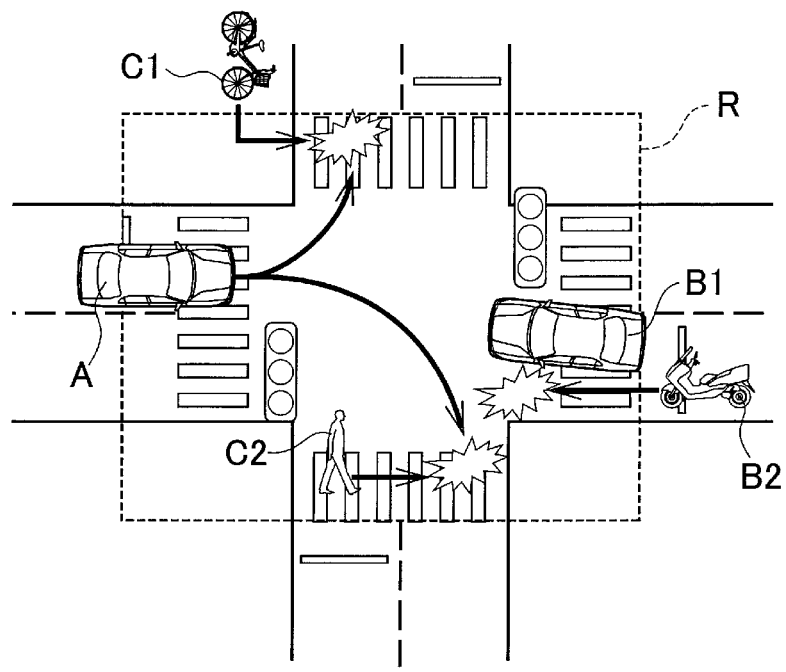
FIG. 5 is a view for describing an example of operation of the autonomous vehicle operating apparatus according to the first embodiment of the present invention.

Alternatively, the operating section setting unit 22 may define the operating section R regardless of the presence or absence of a blind spot so as to switch the current autonomous traveling mode to the second autonomous traveling mode. For example, as shown in FIG. 5, the operating section setting unit 22 defines the operating section R when the number of targets to be checked around the autonomous vehicle A is a predetermined threshold or greater. FIG. 5 illustrates a case in which three traffic participants of a vehicle B2 that may be present in a blind spot caused by a vehicle B1, a bicycle C1 that may pass across the left pedestrian crossing, and a pedestrian C2 that may walk across the right pedestrian crossing, are targets for which the driver should check the safety. Alternatively, the operating section setting unit 22 may simply define the operating section R when the autonomous vehicle A turns to either way at an intersection.

Figure 6:
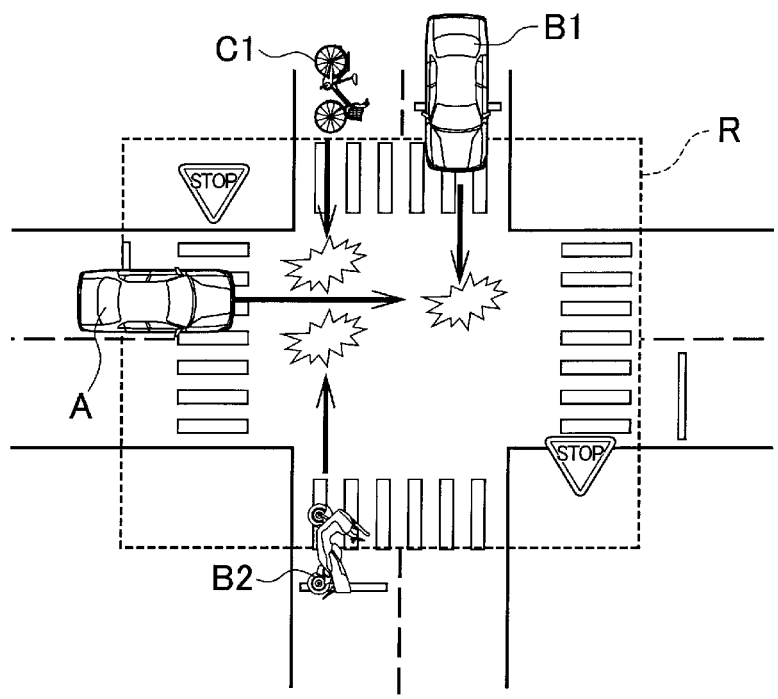
FIG. 6 is a view for describing an example of operation of the autonomous vehicle operating apparatus according to the first embodiment of the present invention.

As shown in FIG. 6, the operating section setting unit 22 may define the operating section at an intersection in a case in which the autonomous vehicle A is traveling on a minor road and passing through the intersection.

Figure 7:
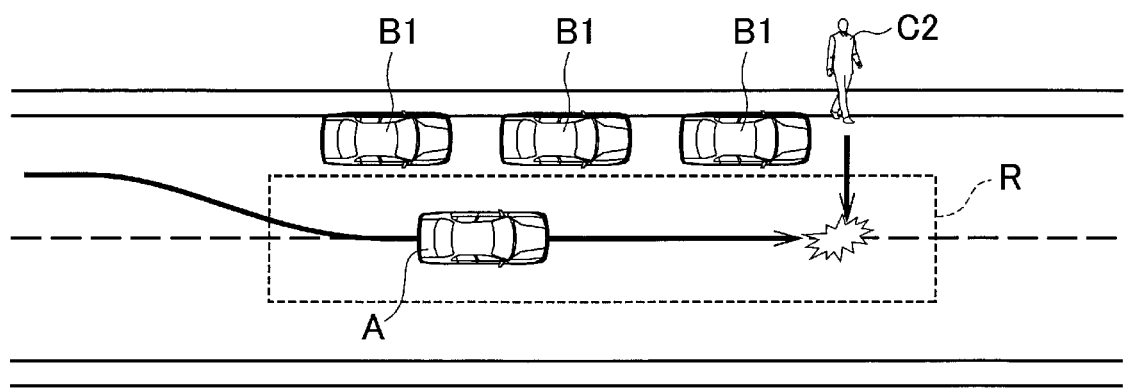
FIG. 7 is a view for describing an example of operation of the autonomous vehicle operating apparatus according to the first embodiment of the present invention.

As shown in FIG. 7, the operating section setting unit 22 may define the operating section in parallel with a plurality of vehicles B1 aligned at the side of a road in a case in which the autonomous vehicle A is passing through the aligned vehicles B1.

Figure 8:
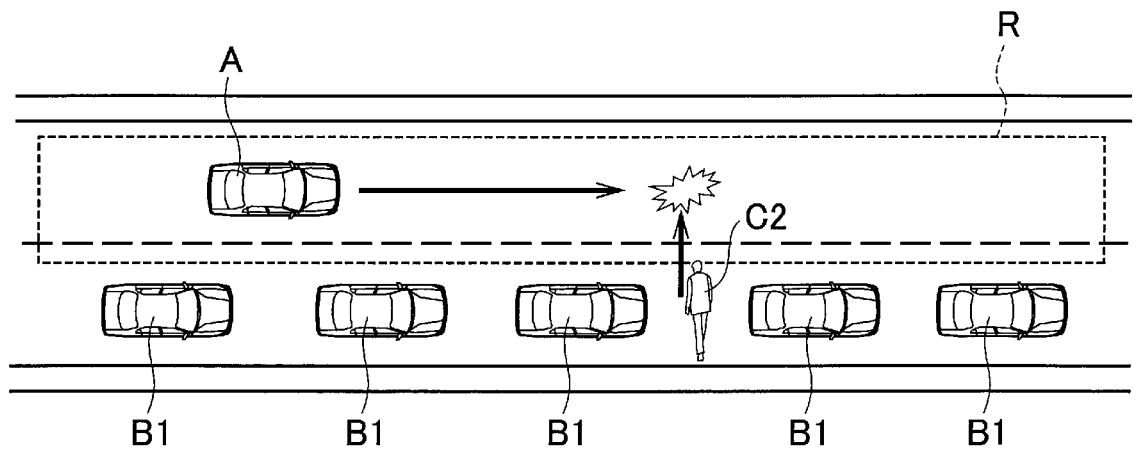
FIG. 8 is a view for describing an example of operation of the autonomous vehicle operating apparatus according to the first embodiment of the present invention.

As shown in FIG. 8, the operating section setting unit 22 may define the operating section in parallel with a plurality of vehicles B1 in a congested lane in a case in which the autonomous vehicle A is traveling in a lane next to the congested lane.

As described above, according to the autonomous vehicle operating apparatus of the first embodiment, the operating section setting unit 22 defines the operating section R in which the autonomous vehicle A travels in the second autonomous traveling mode and should slow down or stop so as to check the safety with respect to other traffic participants that may appear in the traveling direction of the autonomous vehicle A. Since the autonomous vehicle A can travel while the first autonomous traveling mode and the second autonomous traveling mode are autonomously switched depending on the circumstances, the safety of the autonomous vehicle can be enhanced.

According to the autonomous vehicle operating apparatus of the first embodiment, the vehicle control unit 5 controls the autonomous vehicle A to travel when the operating unit 4 is operated and stop when the operating unit 4 is not operated in the second autonomous traveling mode. The simplified operation improves the operability, and the driver thus can check the safety around the autonomous vehicle A. In addition, the autonomous vehicle A can stop immediately at a proper point of time.

The autonomous vehicle operating apparatus according to the first embodiment defines the operating section R based on blind spots caused by obstacles around the autonomous vehicle A. The autonomous vehicle A thus can travel in accordance with the operation by the driver while the driver checks the circumferential safety at a point where other traffic participants may appear suddenly.

The operating section setting unit 22 may also define the operating section R based on a blind spot in a case in which there is a complex point in the blind spot that other traffic participants may enter within a predetermined distance on a road in the traveling direction of the autonomous vehicle A. Examples of complex points include an intersection and a merging point. The autonomous vehicle operating apparatus according to the first embodiment defines the operating section R at a point with a greater degree of importance, so as to enhance the safety of the autonomous vehicle A.

The autonomous vehicle operating apparatus according to the first embodiment defines the operating section R around targets to be checked when the number of the targets is a predetermined threshold or greater, so as to travel in the second autonomous traveling mode at a point where the probability that the autonomous vehicle A may collide with other traffic participants is relatively high. Accordingly, the accuracy in preventing a collision with other traffic participants can be improved, so as to enhance the safety of the autonomous vehicle A.

The circumferential condition detector 12 may detect targets to be checked by type. The type of targets to be checked is determined depending on the size (height, width, and the like), speed, and position of the targets, for example. Children, bicycles, and elderly persons are considered to be specified targets to be checked of which actions are hard to expect. When there is a preliminarily specified target to be checked around the autonomous vehicle A, the operating section setting unit 22 may define the operating section R based on the specified target.

The operating section setting unit 22 may also define the operating section R on a route on which the autonomous vehicle A is traveling during a period in which the detection of the circumferential conditions by the circumferential condition detector 12 is difficult because of inclement weather, obstacles, or the like. Examples of such situations in which the detection of the circumferential conditions is difficult include a case of inclement weather such as rainfall, snowfall, and snow cover, a case in which the sensors are blocked by objects, and a case in which regular communication with the outside is not available. Accordingly, the safety of the autonomous vehicle A can be enhanced, since the autonomous vehicle A can keep the autonomous traveling such that the first autonomous traveling mode is switched to the second autonomous traveling mode when it is difficult to travel in the first autonomous traveling mode safely.

In the second autonomous traveling mode, the vehicle control unit 5 may autonomously stop the autonomous vehicle A regardless of the operation on the operating unit 4 by the driver when the circumferential condition detector 12 detects a target approaching the autonomous vehicle A within a predetermined distance. The vehicle control unit 5 can deal with the approach of a target that the driver fails to notice, so as to improve the safety of the autonomous vehicle A.

In the second autonomous traveling mode, the presenting unit 3 may function as a notifying unit for notifying the driver that the vehicle control unit 5 autonomously stops the autonomous vehicle A in the second autonomous traveling mode when the circumferential condition detector 12 detects a target approaching the autonomous vehicle A. The driver thus can recognize that the autonomous vehicle A is operated regularly when the autonomous vehicle A stops regardless of the operation on the operating unit 4 and that there may be an approaching target that the driver fails to notice due to the presenting unit 3 functioning as a notifying unit.

The presenting unit 3 may notify the driver of undesirable conditions during the second autonomous traveling mode. An example of undesirable conditions is a case in which the autonomous vehicle A remains stopping in an intersection although the circumferential condition detector 12 detects no target approaching the autonomous vehicle A, since the continuous stop may hinder smooth traffic. Another example is a case in which the driver operates the operating unit 4 to stop the autonomous vehicle A at an improper position, such as on a pedestrian crossing, in an opposite lane, and in an intersecting lane. The presenting unit 3 serving as a notifying unit can notify the driver of such an improper stop and urge the driver to operate the operating unit 4 to restart traveling.

When the operating unit 4 is an input device which detects the presence or absence of the operation depending on the displacement caused by a force applied by the driver, the operating unit 4 may include an actuator which displaces the operated portion in the opposite direction of the force applied by the driver when the vehicle control unit 5 autonomously stops the autonomous vehicle A. This configuration can notify the driver that the autonomous vehicle A is operated regularly when the autonomous vehicle A stops regardless of the operation on the operating unit 4 and that there may be an approaching target not recognized by the driver.

When there is no approaching target and the autonomous vehicle A thus can restart traveling, the operating unit 4 is again displaced due to the input by the driver so as to notify the driver that the operation on the operating unit 4 is available and that the autonomous vehicle A can restart traveling since there is no approaching target.

According to the autonomous vehicle operating apparatus of the first embodiment, the presenting unit 3 can present the information on the timing of switching between the first autonomous traveling mode and the second autonomous traveling mode to the driver. The driver thus can start or finish operating the operating unit 4 without long interval when the autonomous traveling modes are switched.

Further, since the autonomous vehicle operating apparatus of the first embodiment presents the current autonomous traveling mode to the driver, the driver can constantly recognize the necessity of the operation on the operating unit 4 according to the current autonomous traveling mode.

Second Embodiment

Figure 9:
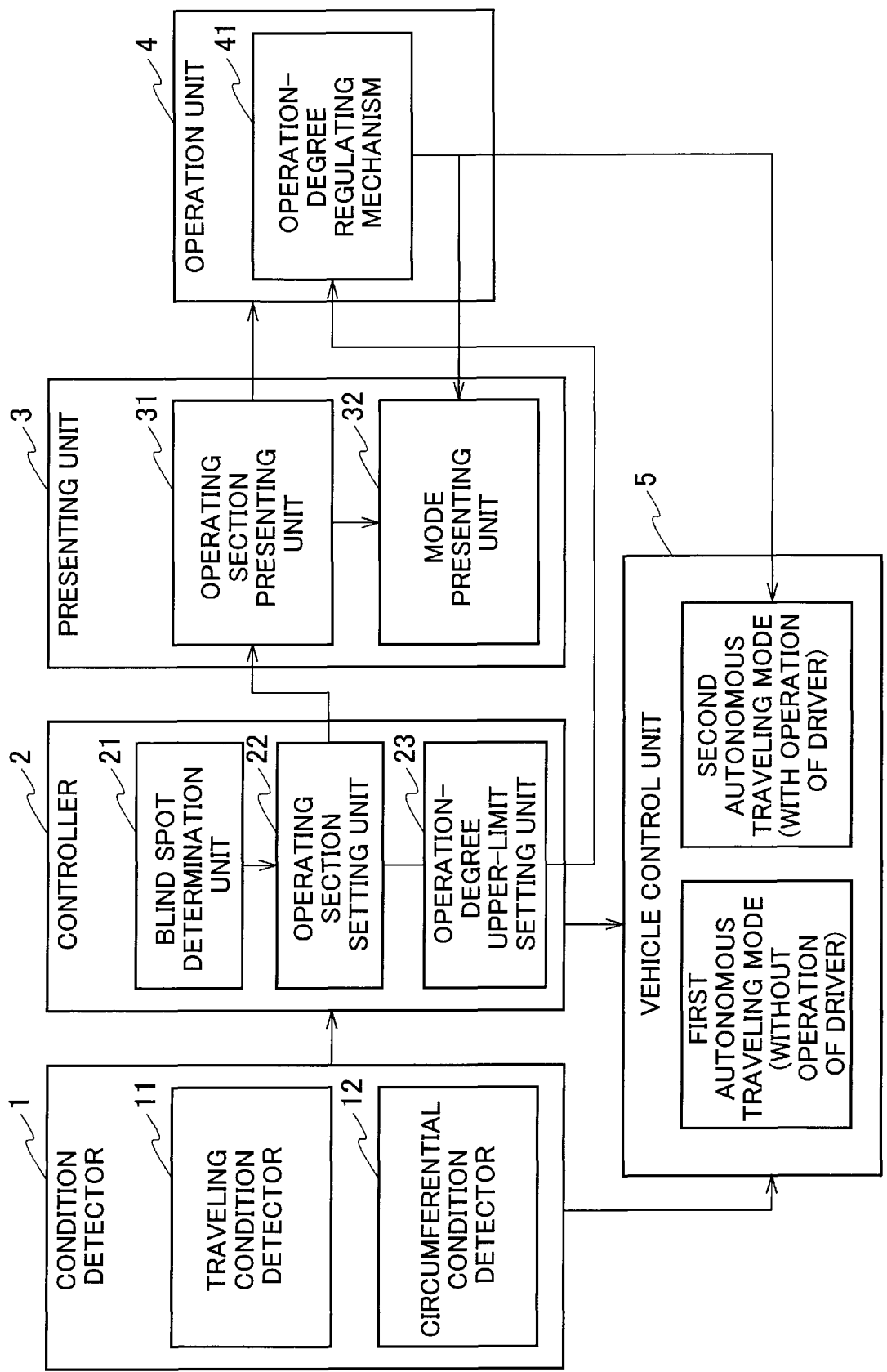
FIG. 9 is a block diagram describing a configuration of an autonomous vehicle operating apparatus according to a second embodiment of the present invention.

An autonomous vehicle operating apparatus according to a second embodiment differs from the autonomous vehicle operating apparatus according to the first embodiment in that the controller 2 further includes an operation-degree upper-limit setting unit 23 and the operating unit 4 further includes an operation-degree regulating mechanism 41, as shown in FIG. 9. The operations and effects in the second embodiment substantially the same as those in the first embodiment are not repeated below.

The operation-degree regulating mechanism 41 detects at least one of the amount of displacement, a force, the number of operations, an operating speed, and an operating direction of the operating unit 4 as a degree of operation operated by the driver. The operation-degree regulating mechanism 41 outputs an output signal corresponding to the detected degree of operation to the vehicle control unit 5. The degree of operation operated by the driver may be in a stepped manner or a continuous manner.

When the operating unit 4 is a push-button input device, the degree of operation can be regulated depending on the amount of displacement, a force, and the number of pushes caused by the operation, for example. When the operating unit 4 is a lever-type input device, the degree of operation can be regulated depending on the amount of displacement, a force, and a direction of the operation, for example. When the operating unit 4 is a pedal-type input device, the degree of operation can be regulated depending on the amount of displacement and a force with respect to the operating unit 4, for example. As an alternative to these input devices, an input device displaceable in the horizontal and vertical directions may be used.

The vehicle control unit 5 regulates a traveling state of the autonomous vehicle A depending on the degree of operation detected by the operation-degree regulating mechanism 41. Examples of traveling states to be regulated include a speed, acceleration, a stop position, and a traveling position of the autonomous vehicle A. The stop position and the traveling position may be regulated in the left-right direction with respect to the traveling direction. For example, the vehicle control unit 5 may control the drive system when the operating unit 4 is operated in the vertical direction so as to regulate the speed of the autonomous vehicle A, and control the steering system when the operating unit 4 is operated in the left-right direction of the horizontal directions so as to regulate the traveling position of the autonomous vehicle A in the left-right direction.

The operation-degree upper-limit setting unit 23 sets an upper limit on the output signal output from the operating unit 4 to the vehicle control unit 5 corresponding to the degree of operation by the driver in the second autonomous traveling mode. For example, when there is a blind spot around the autonomous vehicle A, the operation-degree upper-limit setting unit 23 sets the upper limit on the degree of operation (the output signal) depending on a distance to the blind spot or a size of the blind spot. For example, the operation-degree upper-limit setting unit 23 decreases the upper limit as the blind spot is larger and increases the upper limit as the blind spot is smaller.

The presenting unit 3 may function as a notifying unit for notifying the driver that the degree of operation by the driver reaches the upper limit set by the operation-degree upper-limit setting unit 23. The notice that the degree of operation reaches the upper limit is made by sound such as a chime or by indication such as a notifying sentence. Alternatively, the operating unit 4 for detecting the amount of displacement of the operation may mechanically set the upper limit on the displacement caused by the driver so as to function as a notifying unit.

Autonomous Vehicle Operating Method

Figure 10:
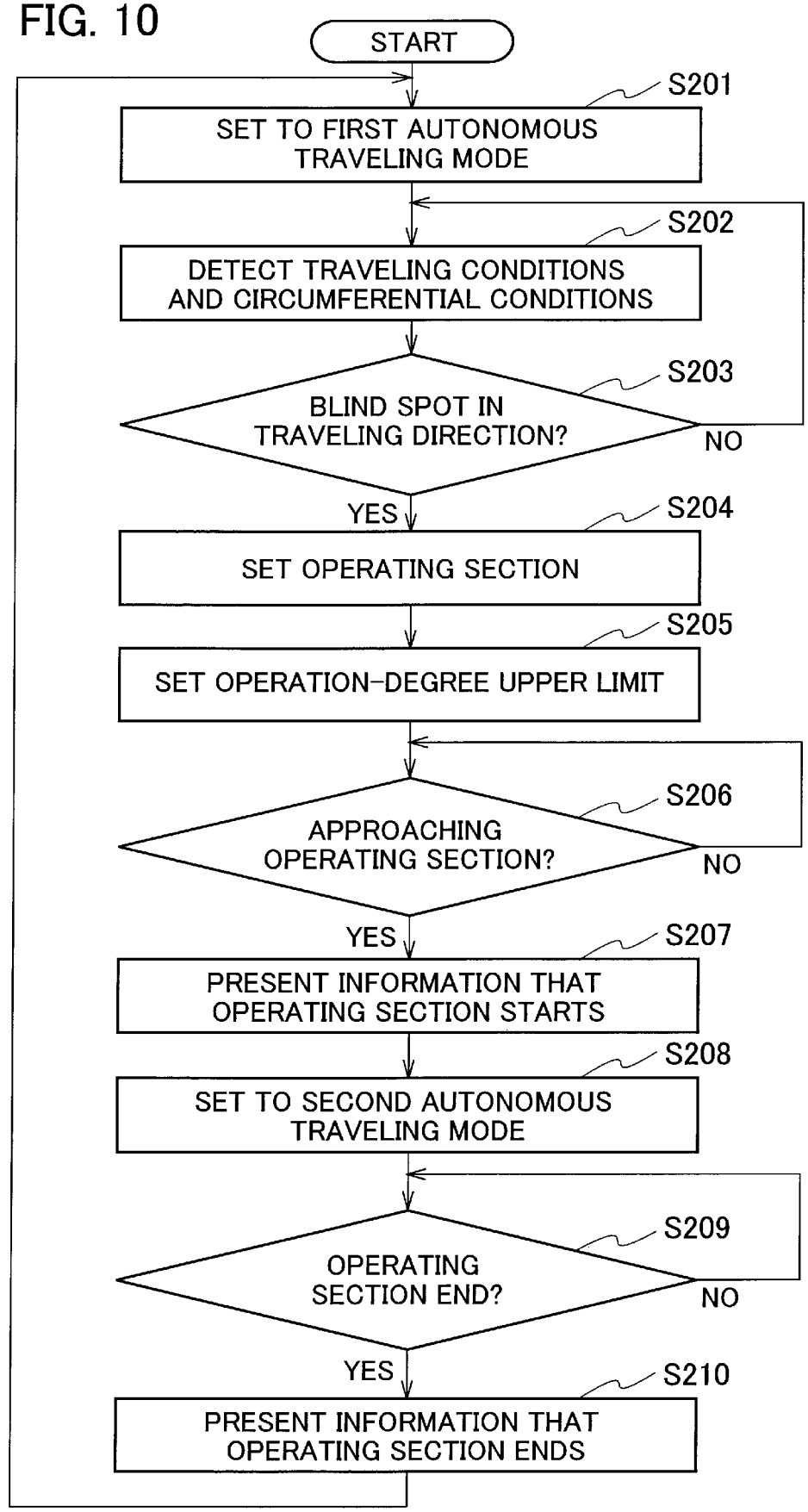
FIG. 10 is a flow chart for describing an autonomous vehicle operating method using the autonomous vehicle operating apparatus according to the second embodiment of the present invention.

An autonomous vehicle operating method using the autonomous vehicle operating apparatus according to the second embodiment is illustrated with reference to the flow chart shown in FIG. 10. The process in steps S201 to S204, S206, S207, S209, and S210 is the same as the process in steps S101 to S106, S108, and S109, and overlapping explanations are not repeated below.

In step S205, the operation-degree upper-limit setting unit 23 sets the upper limit on the output signal, based on the blind spot detected in step S203, denoting the degree of operation by the driver in the second autonomous traveling mode and output from the operating unit 4 to the vehicle control unit 5.

In step S208, the vehicle control unit 5 switches from the first autonomous traveling mode to the second autonomous traveling mode when the autonomous vehicle A enters the operating section R. The vehicle control unit 5 controls the autonomous vehicle A to travel in the second autonomous traveling mode while regulating the traveling state depending on the degree of operation on the operating unit 4 by the driver according to the traveling conditions and the circumferential conditions. Since the degree of operation input to the vehicle control unit 5 does not exceed the upper limit set in step S205, the vehicle control unit 5 can ensure the safety in the second autonomous traveling mode.

Example of Operation

Figure 11:
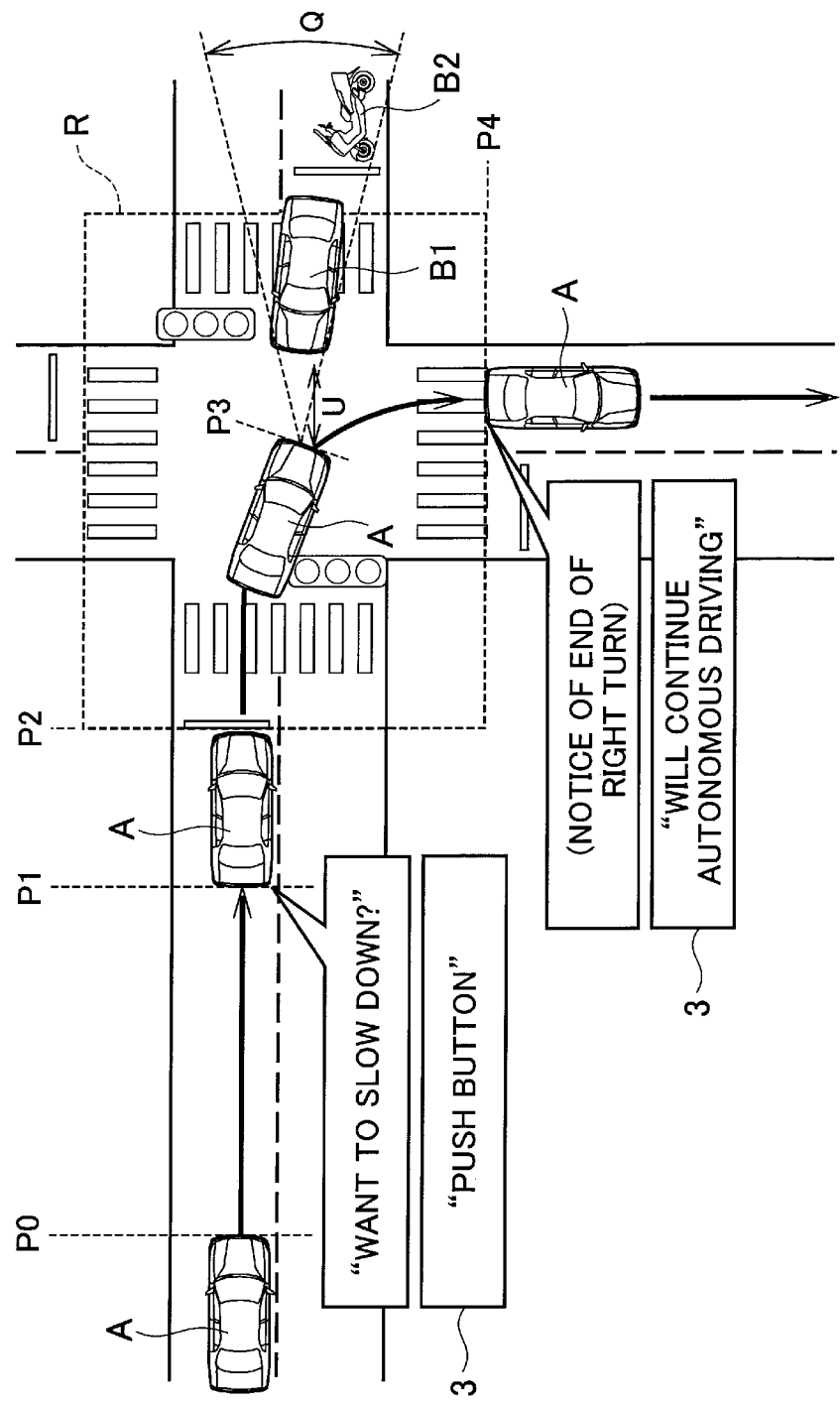
FIG. 11 is a view for describing an example of operation of the autonomous vehicle operating apparatus according to the second embodiment of the present invention.

FIG. 11 illustrates an example of operation of the autonomous vehicle operating apparatus according to the second embodiment in a case in which the autonomous vehicle A turns to the right at an intersection.

When the autonomous vehicle A is passing through the point P0, the vehicle control unit 5 controls the autonomous vehicle A in the first autonomous traveling mode to travel without operation by the driver according to the traveling conditions and the circumferential conditions.

When the autonomous vehicle A reaches the point P1, the blind spot determination unit 21 detects a blind spot Q caused by a vehicle B1 as a traffic participant in the intersection in the traveling direction of the autonomous vehicle A. The operating section setting unit 22 defines the operating section R since the blind spot Q is detected.

The operating section presenting unit 31 indicates a sentence, "Please push the button", for example, so as to present the information preliminarily notifying the driver that the current autonomous traveling mode will be switched to the second autonomous traveling mode. The driver starts operating the operating unit 4 in accordance with the presented information.

When the autonomous vehicle A is reaching the point P2 (the start point of the operating section R), the vehicle control unit 5 sets the current traveling mode to the second autonomous traveling mode while regulating the traveling state depending on the degree of operation by the driver.

When the autonomous vehicle A stars turning right and is reaching the point P3, the driver stops operating the operating unit 4 in order to check that there is no risk of a collision with another vehicle B2 that may appear from the blind spot caused by the vehicle B1. The autonomous vehicle A then stops at the point P3. The blind spot determination unit 21 calculates a distance to a point at which the vehicle B2 may appear from the blind spot Q, as a distance to the blind spot Q, according to the distance U to the vehicle B1 and the size of the vehicle B1. The operation-degree upper-limit setting unit 23 sets the upper limit on the degree of operation according to the distance to the blind spot Q.

When the autonomous vehicle A reaches the point P4 (the end point of the operating section R), the operating section presenting unit 31 reproduces a sound such as a chime and indicate a sentence, "Will continue autonomous driving", for example, so as to present the information notifying the driver that the current autonomous traveling mode is switched to the first autonomous traveling mode. The driver stops operating the operating unit 4 in accordance with the presented information.

Alternatively, the operation-degree upper-limit setting unit 23 may calculate a time margin to collide with an approaching target according to a distance to the target regardless of the presence or absence of a blind spot, so as to set the upper limit on the degree of operation. Since the operation-degree upper-limit setting unit 23 sets the upper limit on the degree of operation when a traffic participant is approaching, the accuracy in preventing a collision with the traffic participant is improved, so as to enhance the safety of the autonomous vehicle A.

The operation-degree upper-limit setting unit 23 may also set the upper limit on the degree of operation depending on the number of targets to be checked around the autonomous vehicle A. The accuracy in preventing a collision with other traffic participants thus can be improved, so as to enhance the safety of the autonomous vehicle A.

The operation-degree upper-limit setting unit 23 may also set the upper limit on the degree of operation depending on specified targets to be checked of which actions are hard to expect around the autonomous vehicle A. Pre-school children, schoolchildren, and bicycles are defined as specified targets to be checked of which actions are hard to expect. The operation-degree upper-limit setting unit 23 sets the upper limit on the degree of operation when there is a preliminarily specified target around the autonomous vehicle A, so as to improve the accuracy in preventing a collision with the other traffic participant and enhance the safety of the autonomous vehicle A.

The operation-degree upper-limit setting unit 23 may also set the upper limit on the degree of operation depending on the level of difficulty in detecting the circumferential conditions by the circumferential condition detector 12. The level of difficulty may be determined according to the brightness of the circumference and weather, for example. The operation-degree upper-limit setting unit 23 sets the upper limit on the degree of operation when the level of difficulty in detecting the circumferential conditions is a predetermined threshold or greater, so as to improve the accuracy in preventing a collision with other traffic participants and enhance the safety of the autonomous vehicle A.

As described above, the autonomous vehicle operating apparatus according to the second embodiment can regulate the traveling state depending on the degree of operation on the operating unit 4 by the driver during the period in which the autonomous vehicle A travels in the second autonomous traveling mode. Accordingly, the driver can reflect the intention when the driver wants to regulate the traveling state such as a speed of the autonomous vehicle A traveling in the second autonomous traveling mode.

The autonomous vehicle operating apparatus according to the second embodiment can mechanically or electrically set the upper limit on the output signal output from the operating unit 4 to the vehicle control unit 5. Accordingly, the traveling state of the autonomous vehicle A in the second autonomous traveling mode can be kept in a predetermined range, so as to enhance the safety of the autonomous vehicle A.

The autonomous vehicle operating apparatus according to the second embodiment can set the upper limit on the output signal when there is a blind spot caused by an obstacle in accordance with at least either a distance to the blind spot or a size of the blind spot. Accordingly, the prevention of a collision with a traffic participant depending on the blind spot can be enhanced, and the safety of the autonomous vehicle A can be promoted.

The autonomous vehicle operating apparatus of the second embodiment can notify the driver that the degree of operation reaches the upper limit such that the presenting unit 3 functions as a notifying unit. The driver thus can recognize that the autonomous vehicle A is operated regularly when the autonomous vehicle A is not traveling in the traveling state corresponding to the degree of operation on the operating unit 4 due to the presenting unit 3 serving as a notifying unit.

Figure 12:
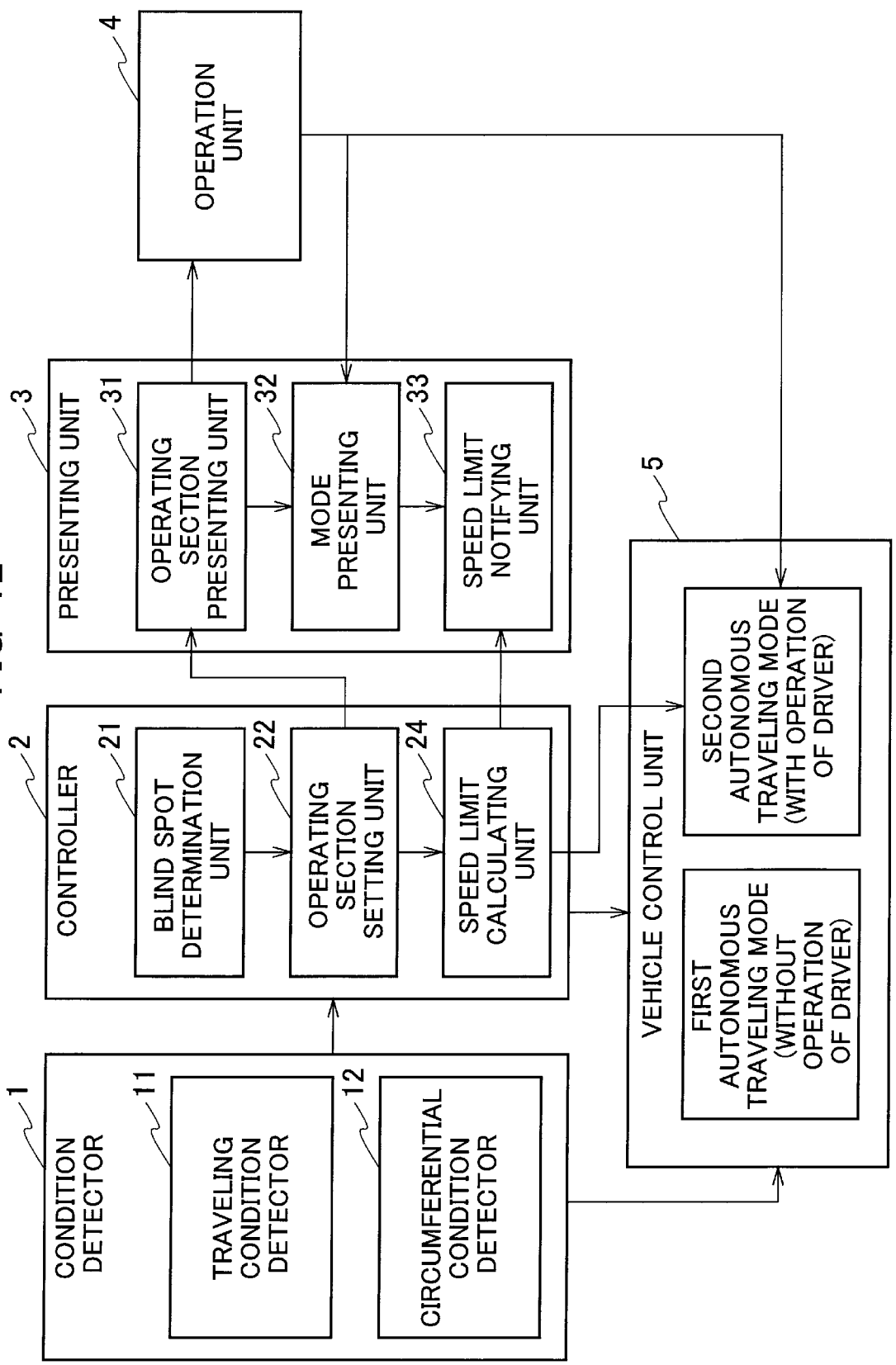
FIG. 12 is a block diagram describing a configuration of an autonomous vehicle operating apparatus according to a third embodiment of the present invention.

An autonomous vehicle operating apparatus according to a third embodiment differs from the autonomous vehicle operating apparatus according to the first and second embodiments in that the controller 2 further includes a speed limit calculating unit 24 and the presenting unit 3 further includes a speed limit notifying unit 33, as shown in FIG. 12. The operations and effects in the third embodiment substantially the same as those in the first and second embodiments are not repeated below.

The speed limit calculating unit 24 calculates a speed limit of the autonomous vehicle A traveling in the second autonomous traveling mode according to the traveling conditions detected by the traveling condition detector 11 and the circumferential conditions detected by the circumferential condition detector 12.

Figure 13:
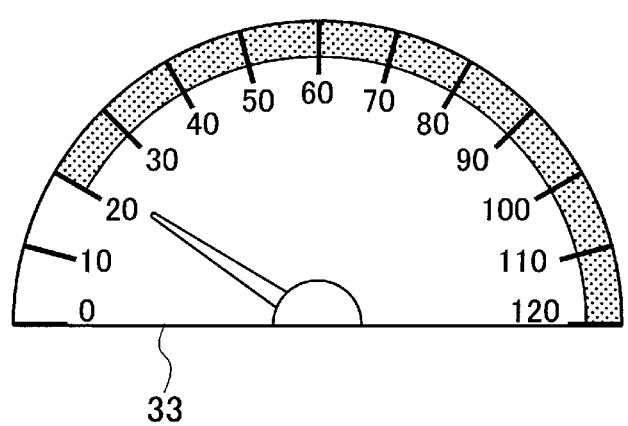
FIG. 13 is a view illustrating a speed limit notifying unit in the autonomous vehicle operating apparatus according to the third embodiment of the present invention.

The speed limit notifying unit 33 notifies the driver of the speed limit calculated by the speed limit calculating unit 24. For example, the speed limit notifying unit 33 can indicate the speed limit by changing graduations on a speedometer, as shown in FIG. 13.

Autonomous Vehicle Operating Method

Figure 14:
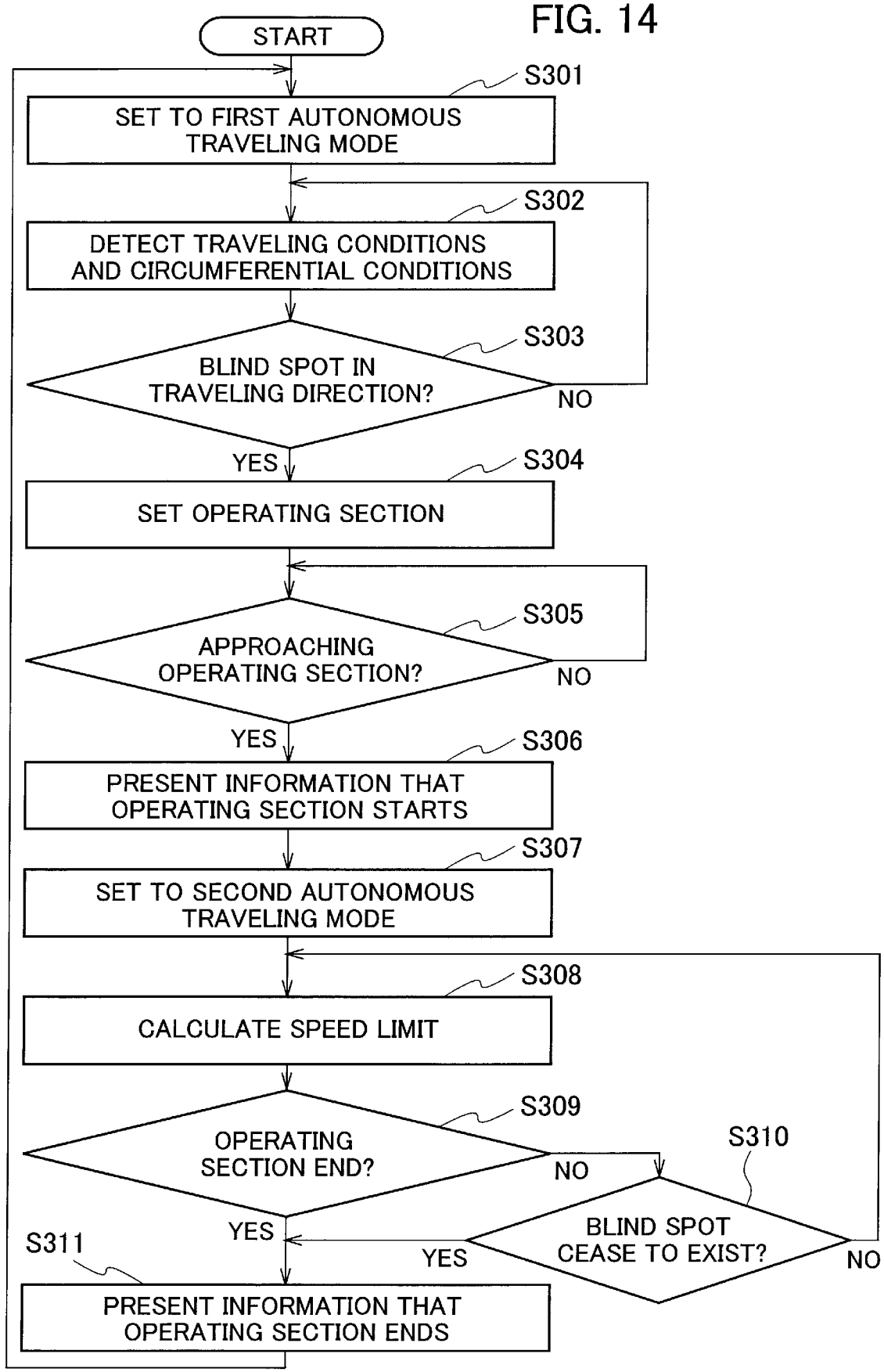
FIG. 14 is a flow chart for describing an autonomous vehicle operating method using the autonomous vehicle operating apparatus according to the third embodiment of the present invention.

An autonomous vehicle operating method using the autonomous vehicle operating apparatus according to the third embodiment is illustrated with reference to the flow chart shown in FIG. 14. The process in steps S301 to S307 is the same as the process in steps S101 to S107, and overlapping explanations are not repeated below.

In step S308, the speed limit calculating unit 24 calculates the speed limit in the second autonomous traveling mode according to at least one of the distance to the obstacle causing the blind spot detected in step S303, the distance to the blind spot, and the size of the blind spot.

In step S309, the controller 2 determines whether the autonomous vehicle A reaches the end point of the operating section R. The process proceeds to step S311 when the autonomous vehicle A is determined to reach the end point, or proceeds to step S310 when the autonomous vehicle A does not reach the end point yet.

In step S310, the blind spot determination unit 21 determines whether the blind spot ceases to exist in the traveling direction of the autonomous vehicle A. The process returns to step S308 when the blind spot is still present, or proceeds to step S311 when the blind spot ceases to exist.

In step S311, the operating section presenting unit 31 presents the information notifying the driver of the end of the operating section R, and the process returns to step S301.

Example of Operation

Figure 15:
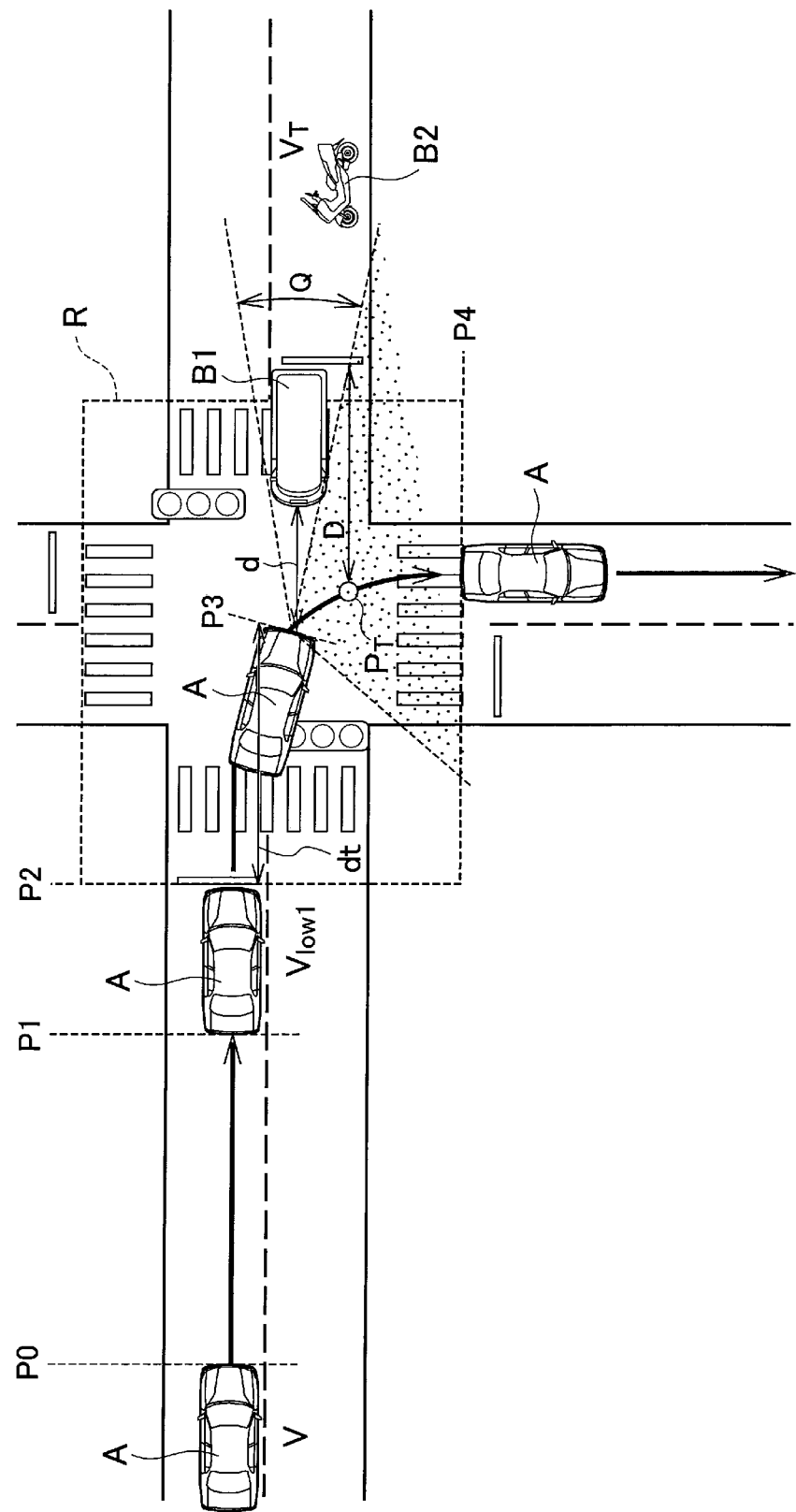
FIG. 15 is a view for describing an example of operation of the autonomous vehicle operating apparatus according to the third embodiment of the present invention.

FIG. 15 illustrates an example of operation of the autonomous vehicle operating apparatus according to the third embodiment in a case in which the autonomous vehicle A turns to the right at an intersection.

When the autonomous vehicle A is passing through the point P0, the vehicle control unit 5 controls the autonomous vehicle A in the first autonomous traveling mode to travel without operation by the driver according to the traveling conditions and the circumferential conditions. The autonomous vehicle A is traveling at a speed of V.

When the autonomous vehicle A reaches the point P1, the blind spot determination unit 21 detects a blind spot Q caused by a vehicle B1 as a traffic participant in the intersection in the traveling direction of the autonomous vehicle A. The operating section setting unit 22 defines the operating section R since the blind spot Q is detected.

The speed limit calculating unit 24 calculates a standby position (the point P3) in the intersection at which the autonomous vehicle A should wait to turn right according to the size of the intersection obtained from the map information and the position of the vehicle B1. The speed limit calculating unit 24 also determines whether there is a space sufficient for a vehicle B2 (a traffic participant) to pass through the side of the vehicle B1 from the blind spot Q. When there is a space, the speed limit calculating unit 24 calculates a presumed collision point $P_T$ at which the autonomous vehicle A may collide with the vehicle B2 appearing from the blind spot Q.

The speed limit calculating unit 24 then calculates a distance d from the autonomous vehicle A at the presumed standby position to the vehicle B1 causing the blind spot Q and a detectable distance D from the blind spot Q to the presumed collision point $P_T$ in the traveling direction of the vehicle B2. When a proportionality constant obtained from the size of the intersection is defined as k, the detectable distance D is represented by the equation (1).

$$D = k \times d \quad (1)$$

The vehicle control unit 5 decelerates the autonomous vehicle A to $V_{Low1}$ before the autonomous vehicle A reaches the point P2 (the start point of the operating section R). When deceleration preliminarily set for normal braking operation is defined as $a_{Low}$, and a distance from the autonomous vehicle A to the point P3 (the standby position in the intersection) is defined as dt, the speed $V_{Low1}$ is represented by the equation (2), for example. The distance dt varies as a distance from the point P2 to the point P3 increases, and the speed $V_{Low1}$ also varies accordingly. The deceleration $a_{Low}$ is 0.2 G, for example.

$$V_{Low1} = \sqrt{(2a_{Low}dt)} \quad (2)$$

When the front edge of the autonomous vehicle A enters the operations section R, the vehicle control unit 5 switches the current autonomous traveling mode to the second autonomous traveling mode, so as to travel at a speed of V corresponding to the degree of operation on the operating unit 4 by the driver. The upper limit of the speed V is set to the range of $V_{Low1} \leq V \leq V_{High1}$ until the autonomous vehicle A reaches the point P3 after entering the operating section R. When deceleration preliminarily set for emergency braking operation is defined as $a_{High}$, the speed $V_{High1}$ is represented by the equation (3), for example. The deceleration $a_{High1}$ is 0.5 G, for example.

$$V_{High1} = \sqrt{(2a_{High}dt)} \quad (3)$$

When the autonomous vehicle A is turning right from the point P3, the vehicle control unit 5 sets the speed of the autonomous vehicle A to $V_{Low2}$. When a speed of the vehicle B2 presumed according to legal speed, actual speed, a type of road, and the like is defined as $V_T$, the speed $V_{Low2}$ is represented by the equation (4), for example.

$$V_{Low2} = (2a_{Low}D)/V_T \quad (4)$$

The vehicle B2 is presumed to be a two-wheeled vehicle traveling at reduced speed when there is a single opposite lane, and presumed to be a four-wheeled vehicle or a two-wheeled vehicle traveling at regular speed when there is more than one opposite lane. The presumed speed $V_T$ thus may be determined depending on the number of opposite lanes or the space on the road at the side of the vehicle B1.

The upper limit of the speed V in the operating section R is set to the range of $V_{Low1} \leq V \leq V_{High1}$ until the autonomous vehicle A reaches the point P3, and set to the range of $V_{Low2} \leq V \leq V_{High2}$ after reaching the point P3. When the deceleration preliminarily set for the emergency braking operation is defined as $a_{High}$, the speed $V_{High2}$ is represented by the equation (5), for example.

$$V_{High2}=(2a_{High}D)/V_T \qquad (5)$$

The driver operates the operating unit 4 while checking whether there are other traffic participants which the autonomous vehicle A may collide with. The vehicle control unit 5 controls the autonomous vehicle A to travel at a speed corresponding to the degree of operation by the driver within the speed limit calculated by the speed limit calculating unit 24.

The speed limit is calculated according to at least one of a distance to an obstacle, a distance to a blind spot, and a size of the blind spot. For example, when a blind spot is large, and the timing at which other traffic participants are found or detected is presumed to be delayed, the deceleration may be presumed to be $a_{Low}$ set for the normal braking operation, and the speed limit may be set to $V_{Low1}$ or $V_{Low2}$. When a blind spot is small, and other traffic participants can be found or detected at an early point, the deceleration may be presumed to be $a_{High}$ set for the emergency braking operation, and the speed limit may be set to $V_{High1}$ or $V_{High2}$.

When the autonomous vehicle A passes through the point P4 to leave the operating section R, the operating section presenting unit 31 presents the information notifying the driver that the second autonomous traveling mode is switched to the first autonomous traveling mode. The driver stops operating the operating unit 4 in accordance with the presented information. The vehicle control unit 5 sets the traveling mode to the first autonomous traveling mode to continue the autonomous traveling.

Figure 16:
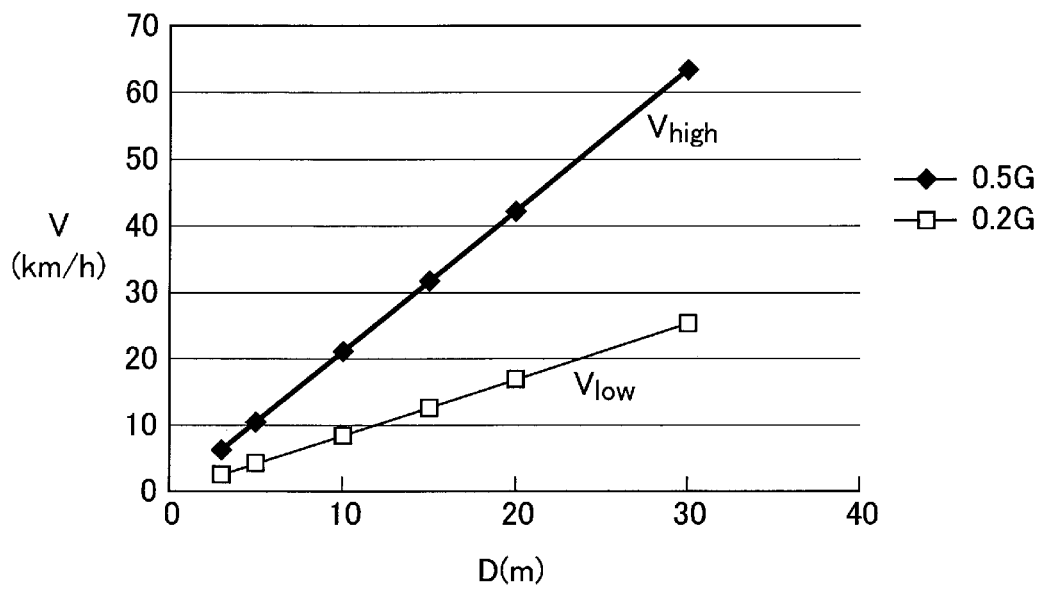
FIG. 16 is a graph illustrating a speed limit calculated by the autonomous vehicle operating apparatus according to the third embodiment of the present invention.
Figure 17:
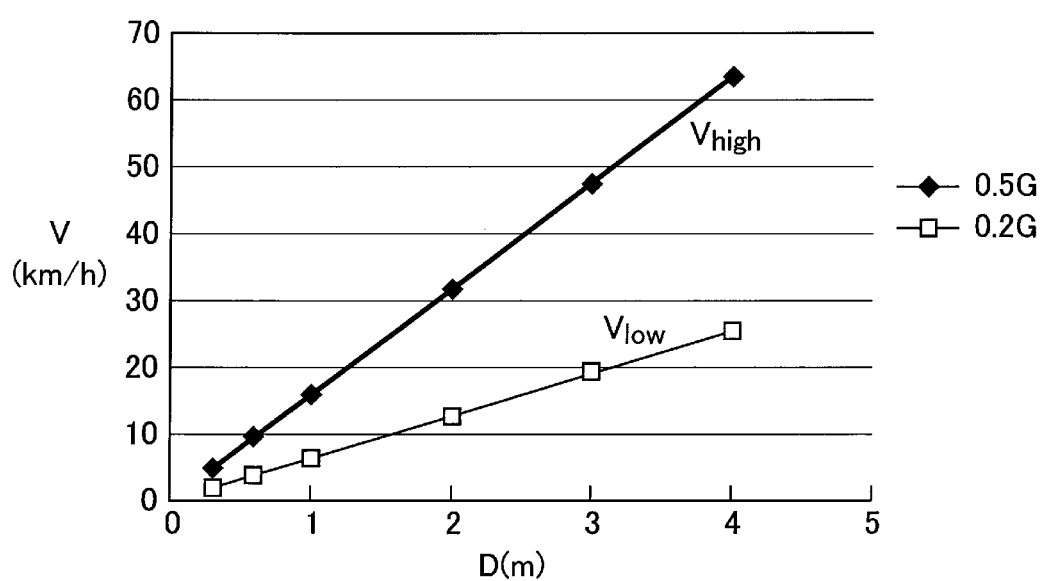
FIG. 17 is a graph illustrating a speed limit calculated by the autonomous vehicle operating apparatus according to the third embodiment of the present invention.

For example, as shown in FIG. 16 and FIG. 17, the speed limit $V_{Low}$ on the presumption that the deceleration is $a_{Low}$ and the speed limit $V_{High}$ on the presumption that the deceleration is $a_{High}$ are calculated in accordance with the presumed speed $V_T$ and the detectable distance D of a traffic participant. FIG. 16 illustrates a case in which a traffic participant which may appear from a blind spot is presumed to be a vehicle, and the presumed speed $V_T$ is presumed to be 60 km/h. FIG. 17 illustrates a case in which a traffic participant is presumed to be a pedestrian, and the presumed speed $V_T$ is presumed to be 8 km/h.

As described above, the autonomous vehicle operating apparatus according to the third embodiment calculates the speed limit of the autonomous vehicle A in accordance with the conditions of the autonomous vehicle A. The autonomous vehicle A thus can ensure a time margin to avoid other traffic participants when passing through the operating section R, so as to reduce the probability of colliding with other traffic participants.

The autonomous vehicle operating apparatus according to the third embodiment can calculate the speed limit based on at least one of a distance to a blind spot and a size of the blind spot. For example, the speed limit can be set to be low (such as 10 km/h) when the blind spot caused by the vehicle B1 is relatively large as shown in FIG. 5 and when the blind spot caused by an obstacle at a corner of the intersection is relatively large as shown in FIG. 6. The speed limit can be set to be high (such as 30 km/h) when the blind spot caused by the vehicle B1 is relatively small as shown in FIG. 7 or FIG. 8. Accordingly, the prevention of a collision with other traffic participants depending on the blind spot can be enhanced, so as to promote the safety of the autonomous vehicle A.

The autonomous vehicle operating apparatus according to the third embodiment may calculate the speed limit based on the presumed speed $V_T$ of a traffic participant when the traffic participant is presumed to enter a road within a predetermined distance in the traveling direction of the autonomous vehicle A. The speed limit thus can be calculated with higher precision, so as to improve the accuracy in avoiding the traffic participant. The speed $V_T$ is presumed according to at least one of a type, a maximum speed limit, and an actual speed of a road on which other traffic participants may be present, for example, so as to improve the accuracy in calculating the speed limit to ensure a time margin to avoid a collision with other traffic participants.

The autonomous vehicle operating apparatus according to the third embodiment calculates the range of speed of the autonomous vehicle A in accordance with the deceleration preliminarily set for the normal braking operation and the deceleration preliminarily set for the emergency braking operation. Accordingly, the accuracy in calculating the speed limit can be improved, and a load of excessive deceleration applied on occupants in the autonomous vehicle A can be reduced.

The driver may preliminarily choose a speed limit within the range of the speed limit determined. The driver thus can apply the brake to avoid an approaching target at deceleration that the driver can afford to manage.

Fourth Embodiment

Figure 18:
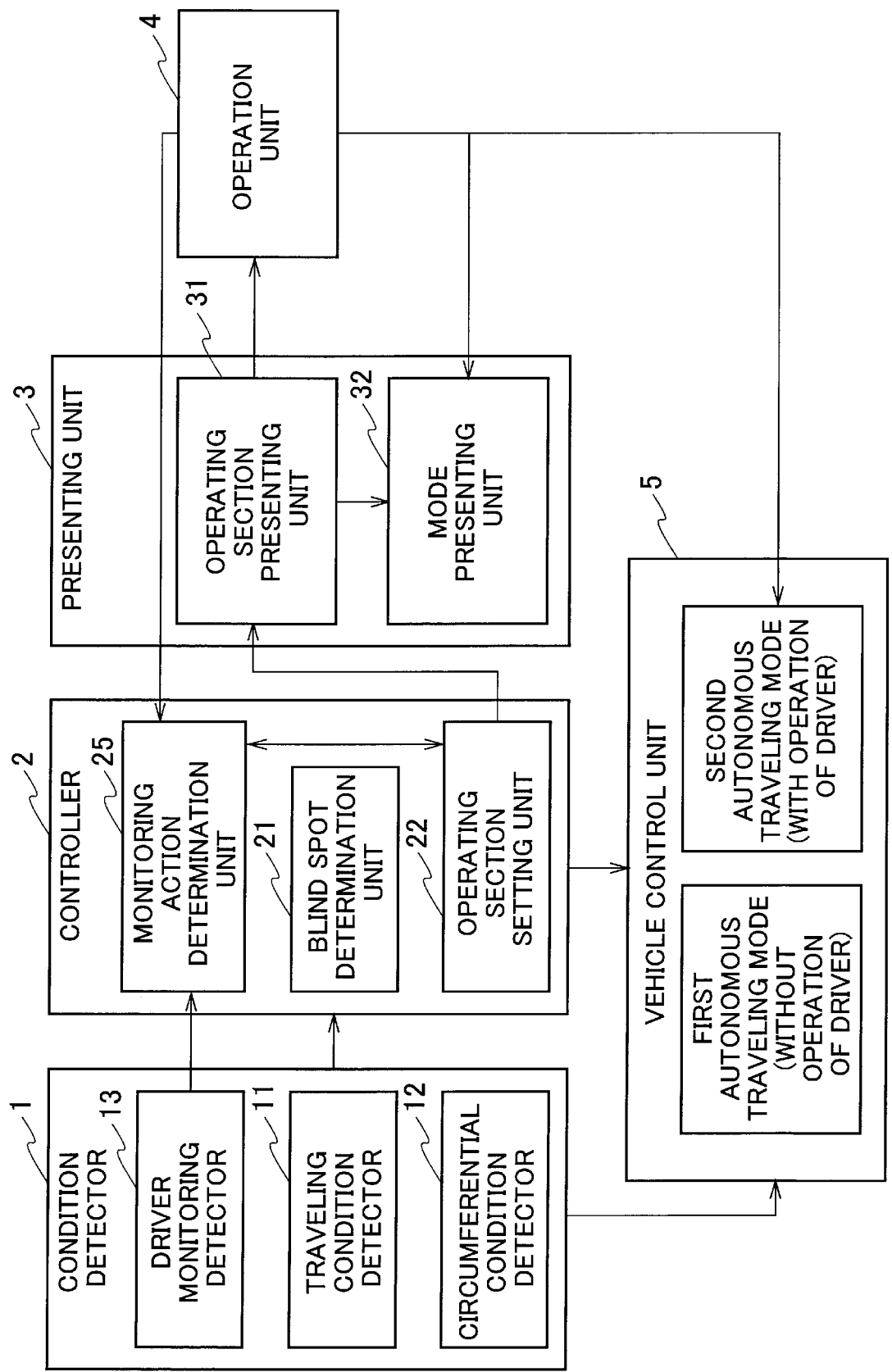
FIG. 18 is a block diagram describing a configuration of an autonomous vehicle operating apparatus according to a fourth embodiment of the present invention.

An autonomous vehicle operating apparatus according to a fourth embodiment differs from the autonomous vehicle operating apparatus according to the first to third embodiments in that the condition detector 1 further includes a driver monitoring detector 13 and the controller 2 further includes a monitoring action determination unit 25, as shown in FIG. 18. The operations and effects in the fourth embodiment substantially the same as those in the first to third embodiments are not repeated below.

The operating unit 4 in the autonomous vehicle operating apparatus according to the fourth embodiment can detect a request operation by the driver to request a shift in the operating section R during a period in which the autonomous vehicle is traveling around the boundary of the operating section R. The request operation is operated on a predetermined input device (a request operating unit) for requesting a start or end of the second autonomous traveling mode. The request operation may be made by a voice of the driver. Alternatively, a request operation for requesting a start of the second autonomous traveling mode (a start request operation) may be detected when the driver starts operating the operating unit 4 during a period in which the autonomous vehicle A is traveling in the first autonomous traveling mode.

The driver monitoring detector 13 detects at least either a motion of the head of the driver or a sight line of the driver by use of a camera, a motion sensor, or the like. Examples of motions of the head detected by the driver monitoring detector 13 include the number of motions of the head, a direction of a motion, and a pattern of a motion. The sight line may be a pattern of shift of eyes.

The monitoring action determination unit 25 determines whether the driver monitors a target to be checked present around the autonomous vehicle A according to at least either the motion of the head or the sight line of the driver detected by the driver monitoring detector 13 when the request operation is detected by the predetermined input device. The monitoring action determination unit 25 may determine whether the driver takes the monitoring action by determining whether the motion of the head or the sight line detected by the driver monitoring detector 13 with respect to the target detected by the circumferential condition detector 12 fulfills predetermined conditions.

The monitoring action determination unit 25 may determine specified targets to be checked that require monitoring according to predetermined conditions. The monitoring action determination unit 25 may determine that the driver does not take the monitoring action when a preliminarily specified target is not monitored yet even through a monitoring action to monitor another target has been detected.

Autonomous Vehicle Operating Method

Figure 19:
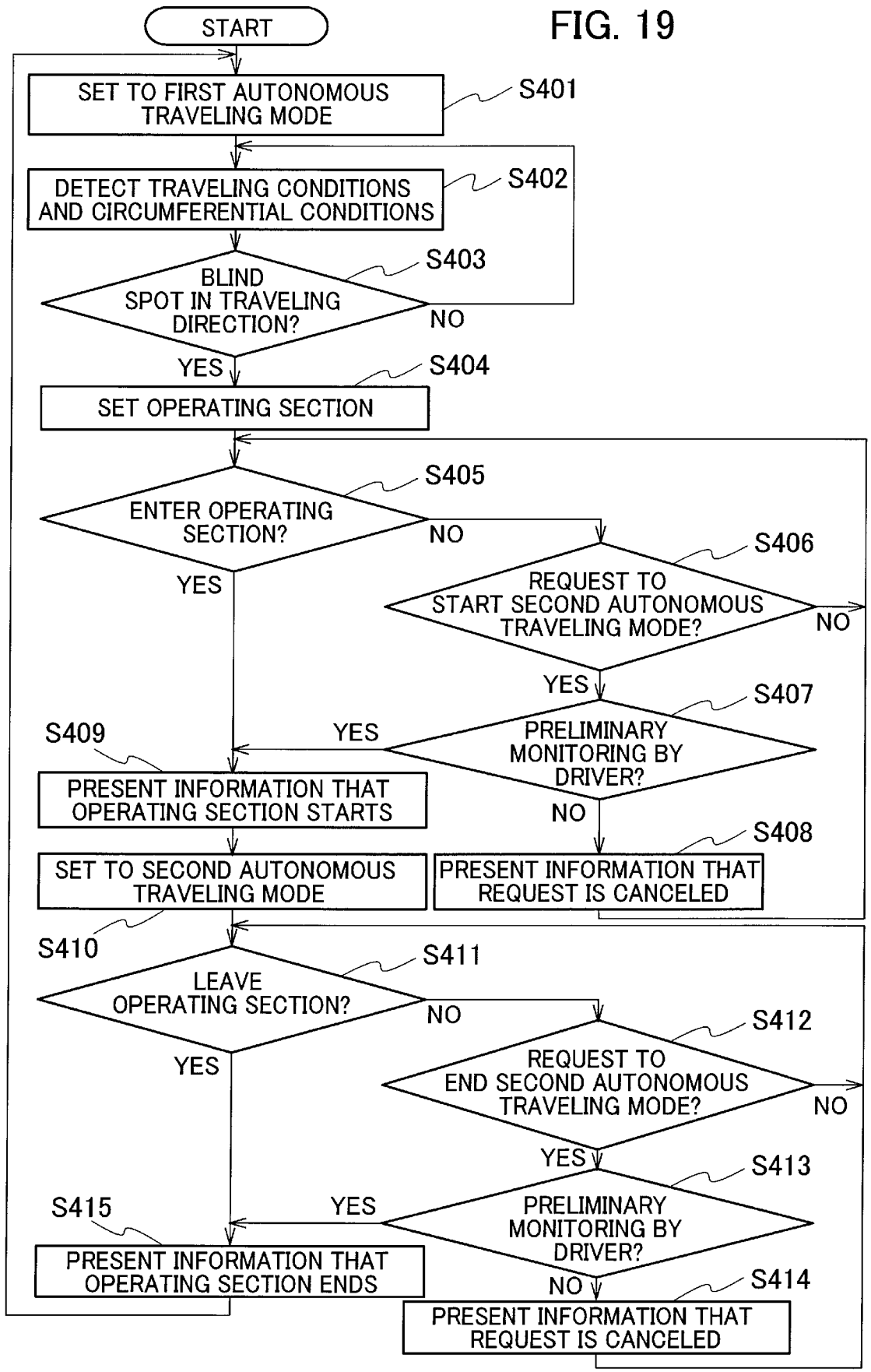
FIG. 19 is a flow chart for describing an autonomous vehicle operating method using the autonomous vehicle operating apparatus according to the fourth embodiment of the present invention.

An autonomous vehicle operating method using the autonomous vehicle operating apparatus according to the fourth embodiment is illustrated with reference to the flow chart shown in FIG. 19. The process in steps S401 to S404 is the same as the process in steps S101 to S104, and overlapping explanations are not repeated below.

In step S405, the controller 2 determines whether the autonomous vehicle A enters the operating section R. The controller 2 determines that the autonomous vehicle A enters the operating section R when the current position of the autonomous vehicle A reaches a start point of the operating section R according to the traveling conditions and the circumferential conditions. The process proceeds to step S409 when the autonomous vehicle A is determined to enter the operating section R, or proceeds to step S406 when the autonomous vehicle A does not enter the operating section R yet.

In step S406, the monitoring action determination unit 25 determines whether a start request operation that the driver requests a start of the second autonomous traveling mode is detected by the operating unit 4 when the autonomous vehicle A is traveling before the start point of the operating section R. The process proceeds to step S407 when the start request operation is detected, or returns to step S405 when the start request operation is not detected yet.

In step S407, the monitoring action determination unit 25 determines whether the driver takes a preliminary monitoring action to monitor a target to be checked present around the autonomous vehicle A according to at least either the motion of the head or the sight line of the driver detected by the driver monitoring detector 13. When the monitoring action is determined to be taken, the operating section setting unit 22 shifts the operating section R set in step S404 so as to set the current position of the autonomous vehicle A to the start point of the operating section R in response to the start request operation, and the process proceeds to step S409. When the monitoring action is not taken yet, the process proceeds to step S408.

In step S408, the presenting unit 3 notifies the driver that the request to start the second autonomous traveling mode is canceled.

In step S409, the operating section presenting unit 31 presents the information notifying the driver that the operating section R, namely, the second autonomous traveling mode starts.

In step S410, the vehicle control unit 5 sets the current autonomous traveling mode to the second autonomous traveling mode since the autonomous vehicle A enters the operating section R. The vehicle control unit 5 controls the autonomous vehicle A in the second autonomous traveling mode to travel in the traveling state corresponding to the degree of operation on the operating unit 4 by the driver according to the traveling conditions and the circumferential conditions.

In step S411, the controller 2 determines whether the autonomous vehicle A is leaving the operating section R. The controller 2 determines that the autonomous vehicle A is leaving the operating section R when the current position of the autonomous vehicle A reaches an end point of the operating section R according to the traveling conditions and the circumferential conditions. The process proceeds to step S415 when the autonomous vehicle is leaving the operating section R, or proceeds to step S412 when the autonomous vehicle A is not leaving the operating section R yet.

In step S412, the process returns to step S411 when the request to end the second autonomous traveling mode is not detected.

In step S413, the monitoring action determination unit 25 determines whether the driver takes a monitoring action to preliminarily monitor a target to be checked present around the autonomous vehicle A according to at least either the motion of the head or the sight line of the driver detected by the driver monitoring detector 13. When the monitoring action is determined to be taken, the operating section setting unit 22 shifts the operating section R set in step S404 so as to set the current position of the autonomous vehicle A to the end point of the operating section R in response to the end request operation, and the process proceeds to step S415. When the monitoring action is not taken yet, the process proceeds to step S414.

In step S414, the presenting unit 3 notifies the driver that the request to end the second autonomous traveling mode is canceled.

In step S415, the operating section presenting unit 31 presents the information notifying the driver that the operating section R ends, and the process returns to step S401.

Example of Operation

Figure 20:
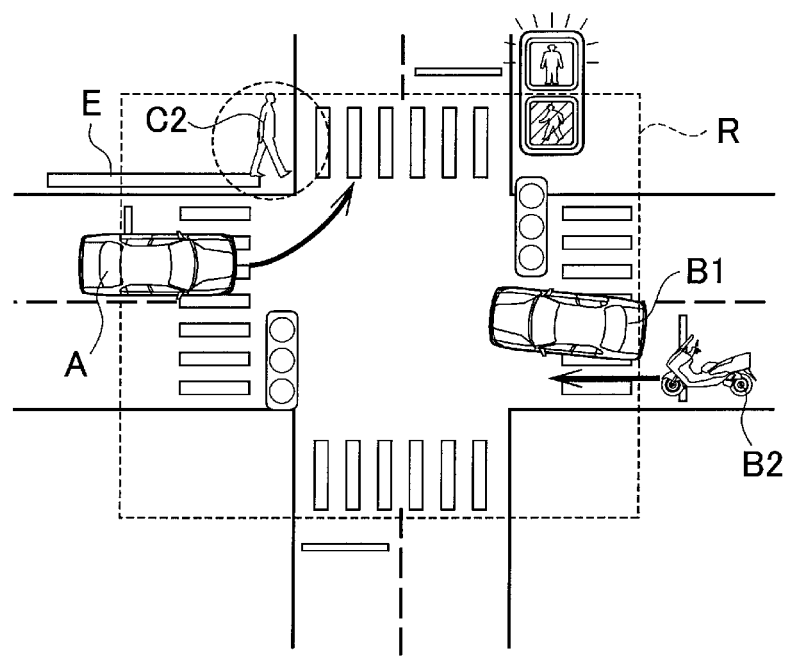
FIG. 20 is a view for describing an example of operation of the autonomous vehicle operating apparatus according to the fourth embodiment of the present invention.

FIG. 20 illustrates an example of operation of the autonomous vehicle operating apparatus according to the fourth embodiment in a case in which the autonomous vehicle A turns to the left at an intersection.

When the autonomous vehicle A is traveling in the first autonomous traveling mode, the operating section setting unit 22 defines the operating section R at the intersection in which a blind spot caused by an obstacle E is present, for example. The autonomous vehicle A decelerates to the speed $V_{Low}$ before entering the operating section R in the first autonomous traveling mode. The driver is presumed to monitor a pedestrian C2 in the blind spot caused by the obstacle E and check that there is no risk of a collision with the pedestrian C2. The driver monitoring detector 13 detects at least either the motion of the head or the sight line of the driver upon the monitoring action to monitor the pedestrian C2.

The monitoring action determination unit 25 determines whether the driver takes the monitoring action to monitor the pedestrian C2 who the autonomous vehicle A may collide with in accordance with the result of the detection by the driver monitoring detector 13 in response to the start request operation on the operating unit 4 by the driver. The operating section setting unit 22 shifts the operating section R so as to set the current position of the autonomous vehicle A to the start point of the operating section R when the monitoring action determination unit 25 determines that the driver takes the monitoring action.

Namely, the vehicle control unit 5 can switch the first autonomous traveling mode of the autonomous vehicle A traveling before the operating section R to the second autonomous traveling mode in response to the start request operation by the driver, so as to control the autonomous vehicle A to travel within the speed limit calculated by the speed limit calculating unit 24, for example.

When the autonomous vehicle A is traveling in the operating section R in the second autonomous traveling mode, the driver is presumed to monitor a target to be checked, such as the pedestrian C2, and check that there is no risk of a collision with the target. The monitoring action determination unit 25 determines whether the driver takes the monitoring action to monitor the target to be checked in accordance with the result of the detection by the driver monitoring detector 13 in response to the end request operation on the operating unit 4 by the driver. The operating section setting unit 22 shifts the operating section R so as to set the current position of the autonomous vehicle A to the end point of the operating section R when the monitoring action determination unit 25 determines that the driver takes the monitoring action.

Namely, the vehicle control unit 5 can switch the second autonomous traveling mode of the autonomous vehicle A traveling before the end point of the operating section R to the first autonomous traveling mode in response to the end request operation by the driver.

As described above, the autonomous vehicle operating apparatus according to the fourth embodiment determines whether the driver takes the monitoring action in response to the request operation by the driver, so as to shift the operating section R when the monitoring action is taken. The autonomous vehicle operating apparatus according to the fourth embodiment thus can reflect the intension of the driver while ensuring the safety even when the timing of changing the operating section R differs between the determination of the system and the intention of the driver.

The autonomous vehicle operating apparatus according to the fourth embodiment can start or end the second autonomous traveling mode in response to the request operation by the driver to request the start or end of the second autonomous traveling mode. Therefore, uncomfortableness of the driver can be reduced since the driver can start or end the second autonomous traveling mode when the driver preliminarily checks the safety before the start point or the end point of the operating section R.

The autonomous vehicle operating apparatus according to the fourth embodiment determines whether the driver takes the monitoring action to monitor a target to be checked according to at least either the motion of the head or the sight line of the driver, so as to improve the accuracy in determining the presence or absence of the monitoring action. The autonomous vehicle operating apparatus permits the shift in the operating section R only when the monitoring action is taken, so as to ensure the safety at the time of switching between the autonomous traveling modes.

Further, the autonomous vehicle operating apparatus according to the fourth embodiment determines that the driver does not take the monitoring action when a preliminarily specified target is not monitored yet even though a monitoring action to monitor another target has been detected. The autonomous vehicle operating apparatus cancels the request to switch between the autonomous traveling modes when the driver does not take the monitoring action to monitor the specified target with a greater degree of importance, for example, so as to reduce the risk of a collision or the like due to failure to check the target by the driver.

OTHER EMBODIMENTS

While the present invention has been described above with reference to the first to fourth embodiments, it should be understood that the present invention is not intended to be limited to the descriptions and the drawings composing part of this disclosure. Various alternative embodiments, examples, and technical applications will be apparent to those skilled in the art according to this disclosure.

For example, in the first to fourth embodiments, the operating section setting unit 22 may release the operating section R to switch the second autonomous traveling mode to the first autonomous traveling mode when the vehicle B1 as an obstacle passes through the intersection, for example, and the blind spot Q thus ceases to exist.

The respective functions in the first to fourth embodiments may be implemented in one or plural processing circuits. Each processing circuit includes a programed processing unit including an electrical circuit. Each processing circuit also includes an application specific integrated circuit (ASIC) or conventional circuit components configured to implement the functions as described in the respective embodiments.

The characteristic elements included in the respective autonomous vehicle operating apparatuses according to the first to fourth embodiments can be combined together as appropriate and mutually applicable with no technical contradiction. It will be evident that the present invention may include various embodiments not described herein. Therefore, the scope of the present invention is defined only by the appended claims appropriately interpreted.

REFERENCE SIGNS LIST

3 PRESENTING UNIT
4 OPERATING UNIT
5 VEHICLE CONTROL UNIT
11 TRAVELING CONDITION DETECTOR
12 CIRCUMFERENTIAL CONDITION DETECTOR
22 OPERATING SECTION SETTING UNIT
23 OPERATION-DEGREE UPPER-LIMIT SETTING UNIT
24 SPEED LIMIT CALCULATING UNIT
25 MONITORING ACTION DETERMINATION UNIT
31 OPERATING SECTION PRESENTING UNIT (PRESENTING UNIT)
32 MODE PRESENTING UNIT (PRESENTING UNIT)

The invention claimed is:
1. An autonomous vehicle operating apparatus including one or more processing circuits, comprising:
 a traveling condition detector configured to detect a traveling condition of an autonomous vehicle;
 a circumferential condition detector configured to detect a circumferential condition of the autonomous vehicle, and installed in the autonomous vehicle and having a first autonomous traveling mode for traveling without operation by a driver and a second autonomous traveling mode for traveling semi-autonomously in accordance with an operation by the driver according to the traveling condition and the circumferential condition, wherein an operating section setting unit configured to define an operating section in which the autonomous vehicle travels in the second autonomous traveling mode according to at least one of the traveling condition and the circumferential condition;

an operating unit configured to detect an operation operated by the driver; and a vehicle control unit configured to control the autonomous vehicle to travel with the second autonomous traveling mode when the operating unit detects the operation of the driver during a period in which the autonomous vehicle travels in the operating section, and configured to control the autonomous vehicle to stop when the operating unit does not detect the operation of the driver, wherein the operating unit includes an input device which has no direct relation to the operation by the driver,
the vehicle control unit continues the first autonomous traveling mode in the operating section as long as the operation via the operating unit continues, and stops the autonomous vehicle when the operation via the operating unit stops,
the operating unit detect the operation before entering into the operating section, and
the vehicle control unit stops the autonomous vehicle before entering into the operating section when the operation is not detected.

2. The autonomous vehicle operating apparatus according to claim 1, wherein, in the second autonomous traveling mode, the vehicle control unit controls the autonomous vehicle to travel when the operating unit intermittently detects the operation by the driver, and stops the autonomous vehicle in the operating section when an operation is not intermittently detected.

3. The autonomous vehicle operating apparatus according to claim 1, wherein, when there is a blind spot caused by an obstacle around the autonomous vehicle, the operating section setting unit defines the operating section based on the blind spot.

4. The autonomous vehicle operating apparatus according to claim 1, wherein, when a number of targets to be checked present around the autonomous vehicle is a predetermined threshold or greater, the operating section setting unit defines the operating section based on the number of targets to be checked.

5. The autonomous vehicle operating apparatus according to claim 1, wherein, when there is a specified target to be checked of which an action is hard to expect around the autonomous vehicle, the operating section setting unit defines the operating section based on the specified target.

6. The autonomous vehicle operating apparatus according to claim 1, wherein the operating section setting unit defines the operating section when it is difficult for the circumferential condition detector to detect the circumferential condition.

7. The autonomous vehicle operating apparatus according to claim 1, wherein the vehicle control unit includes a notifying unit configured to notify the driver that the autonomous vehicle is stopped autonomously.

8. The autonomous vehicle operating apparatus according to claim 7, wherein:
the operating unit is an input device configured to detect a presence or absence of the operation by the driver according to displacement of the operating unit caused by a force applied by the driver;
the vehicle control unit controls the autonomous vehicle to travel when the operating unit detects the operation by the driver, and stops the autonomous vehicle when no operation is detected; and
the input device is displaced in a direction opposite to a direction in which the force is applied by the driver when the vehicle control unit autonomously stops the autonomous vehicle.

9. The autonomous vehicle operating apparatus according to claim 1, further comprising a presenting unit configured to present, to the driver, information on a timing of switching between the first autonomous traveling mode and the second autonomous traveling mode.

10. The autonomous vehicle operating apparatus according to claim 9, wherein the presenting unit presents, to the driver, a current mode when the current mode is either the first autonomous traveling mode or the second autonomous traveling mode.

11. The autonomous vehicle operating apparatus according to claim 1, wherein the vehicle control unit regulates a traveling state of the autonomous vehicle depending on a degree of the operation on the operating unit by the driver in the second autonomous traveling mode.

12. The autonomous vehicle operating apparatus according to claim 11, wherein the operating unit detects at least one of an amount of displacement, a force, a number of operations, an operating speed, and an operating direction of the operating unit operated by the driver as the degree of the operation.

13. The autonomous vehicle operating apparatus according to claim 11, wherein the vehicle control unit regulates at least one of a speed, acceleration, and a traveling position of the autonomous vehicle as the traveling state.

14. The autonomous vehicle operating apparatus according to claim 11, further comprising an operation-degree upper-limit setting unit configured to set an upper limit on an output signal output from the operating unit to the vehicle control unit, the output signal being the degree of the operation.

15. The autonomous vehicle operating apparatus according to claim 14, wherein, when there is a blind spot caused by an obstacle around the autonomous vehicle, the operation-degree upper-limit setting unit sets the upper limit based on a distance to the blind spot or a size of the blind spot.

16. The autonomous vehicle operating apparatus according to claim 14, wherein the operation-degree upper-limit setting unit sets the upper limit based on a distance to a target approaching the autonomous vehicle.

17. The autonomous vehicle operating apparatus according to claim 14, wherein the operation-degree upper-limit setting unit sets the upper limit based on a number of targets to be checked present around the autonomous vehicle.

18. The autonomous vehicle operating apparatus according to claim 14, wherein, when there is a specified target to be checked of which an action is hard to expect around the autonomous vehicle, the operation-degree upper-limit setting unit sets the upper limit based on the specified target to be checked.

19. The autonomous vehicle operating apparatus according to claim 14, wherein the operation-degree upper-limit setting unit sets the upper limit based on a degree of difficulty in detecting the circumferential condition by the circumferential condition detector.

20. The autonomous vehicle operating apparatus according to claim 14, further comprising a notifying unit configured to notify the driver that the degree of the operation by the driver reaches the upper limit set by the operation-degree upper-limit setting unit.

21. The autonomous vehicle operating apparatus according to claim 1, further comprising a speed limit calculating unit configured to calculate a speed limit of the autonomous vehicle in the second autonomous traveling mode according to the traveling condition and the circumferential condition.

22. The autonomous vehicle operating apparatus according to claim 21, wherein, when there is a blind spot caused by an obstacle around the autonomous vehicle, the speed limit calculating unit calculates the speed limit based on at least one of a distance to the obstacle, a distance to the blind spot, and a size of the blind spot.

23. The autonomous vehicle operating apparatus according to claim 21, wherein, when there is a traffic participant presumed to enter a road within a predetermined distance in a traveling direction of the autonomous vehicle, the speed limit calculating unit calculates the speed limit based on a presumed speed of the traffic participant.

24. The autonomous vehicle operating apparatus according to claim 23, wherein the speed limit calculating unit calculates the presumed speed based on at least one of a type of the road on which the traffic participant is present, a maximum speed limit on the road, and an actual speed on the road.

25. The autonomous vehicle operating apparatus according to claim 21, wherein the speed limit calculating unit calculates the speed limit based on preliminarily set deceleration of the autonomous vehicle.

26. The autonomous vehicle operating apparatus according to claim 25, wherein the speed limit calculating unit calculates a range of speed of the autonomous vehicle in the second autonomous traveling mode according to deceleration preliminarily set for normal braking operation and deceleration preliminarily set for emergency braking operation.

27. The autonomous vehicle operating apparatus according to claim 1, wherein:
the operating unit detects a request operation by the driver to request a shift in the operating section when the autonomous vehicle is traveling around the operating section;
the autonomous vehicle operating apparatus further comprises a monitoring action determination unit configured to determine whether the driver takes a monitoring action to monitor a target to be checked present around the autonomous vehicle when the request operation is detected; and
the operating section setting unit shifts the operating section in response to the request operation when the monitoring action determination unit determines that the driver takes the monitoring action.

28. The autonomous vehicle operating apparatus according to claim 27, wherein:
the operating unit detects a start request operation by the driver to request a start of the second autonomous traveling mode when the autonomous vehicle is traveling before a start point of the operating section;
the monitoring action determination unit determines whether the driver takes the monitoring action when the start request operation is detected; and
the operating section setting unit shifts the start point of the operating section to a current position of the autonomous vehicle in response to the start request operation when the monitoring action determination unit determines that the driver takes the monitoring action.

29. The autonomous vehicle operating apparatus according to claim 27, wherein:
the operating unit detects an end request operation by the driver to request an end of the second autonomous traveling mode when the autonomous vehicle is traveling before an end point of the operating section;
the monitoring action determination unit determines whether the driver takes the monitoring action when the end request operation is detected; and
the operating section setting unit shifts the end point of the operating section to a current position of the autonomous vehicle in response to the end request operation when the monitoring action determination unit determines that the driver takes the monitoring action.

30. The autonomous vehicle operating apparatus according to claim 27, wherein the monitoring action determination unit determines whether the driver takes the monitoring action according to at least either a motion of a head of the driver or a sight line of the driver.

31. The autonomous vehicle operating apparatus according to claim 27, wherein the monitoring action determination unit determines that the driver does not take the monitoring action when the monitoring action by the driver to monitor a preliminarily specified target to be checked is not detected.

32. An autonomous vehicle operating method implemented by one or more processing circuits for an autonomous vehicle having a first autonomous traveling mode for traveling without operation by a driver and a second autonomous traveling mode for traveling semi-autonomously in accordance with an operation by the driver according to a traveling condition and a circumferential condition, the method comprising:
defining an operating section in which the autonomous vehicle travels in the second autonomous traveling mode according to the traveling condition and the circumferential condition;
detecting an operation operated by the driver; and
controlling the autonomous vehicle to travel in the second autonomous traveling mode when the operation by the driver is detected during a period in which the autonomous vehicle travels in the operating section, and controlling the autonomous vehicle to stop when the operation of the driver is not detected,
wherein the detecting the operation includes detection by an input device which has no direct relation to the operation by the driver,
in the controlling the autonomous vehicle, the first autonomous traveling mode continues in the operating section as long as the operation continues, and the autonomous vehicle stops when the operation stops,
the detecting the operation before entering into the operating section, and
the autonomous vehicle stops before entering into the operating section when the operation is not detected.

* * * * *